(12) United States Patent
Peppel

(10) Patent No.: US 11,977,994 B2
(45) Date of Patent: May 7, 2024

(54) MULTI-DIMENSIONAL VISUALIZATION OF TEMPORAL INFORMATION

(71) Applicant: Tickr, Inc., San Francisco, CA (US)

(72) Inventor: Tyler Peppel, Belvedere, CA (US)

(73) Assignee: Tickr, Inc., San Francisco, CA (US)

( * ) Notice: Subject to any disclaimer, the term of this patent is extended or adjusted under 35 U.S.C. 154(b) by 22 days.

(21) Appl. No.: 15/881,628

(22) Filed: Jan. 26, 2018

(65) Prior Publication Data

US 2018/0150771 A1 May 31, 2018

Related U.S. Application Data

(63) Continuation of application No. 13/338,170, filed on Dec. 27, 2011, now Pat. No. 9,881,257.

(60) Provisional application No. 61/427,961, filed on Dec. 29, 2010.

(51) Int. Cl.
*G06F 3/0484* (2022.01)
*G06F 16/9032* (2019.01)
*G06F 16/9038* (2019.01)
*G06Q 10/00* (2023.01)

(52) U.S. Cl.
CPC .......... *G06Q 10/00* (2013.01); *G06F 3/0484* (2013.01); *G06F 16/90328* (2019.01); *G06F 16/9038* (2019.01); *G06F 2203/04806* (2013.01)

(58) Field of Classification Search
CPC .. G06Q 10/00; G06Q 50/01; G06F 16/90328; G06F 16/9038; G06F 3/0484; G06F 2203/04806; G06F 16/168; G06F 16/287; G06F 16/358; G06F 16/34–345; G06F 16/44; G06F 16/54; G06F 16/64; G06F 16/74; G06F 16/904; G06F 9/451; H04N 21/44226; H04N 21/44222; H04N 21/44224; H04L 51/32
USPC ........................................................ 715/730
See application file for complete search history.

(56) References Cited

U.S. PATENT DOCUMENTS

| | | |
|---|---|---|
| 5,483,468 A | 1/1996 | Chen et al. |
| 6,510,419 B1 | 1/2003 | Gatto et al. |
| 8,332,767 B1 | 12/2012 | Beil et al. |
| 8,850,320 B2 | 9/2014 | Taylor |
| 2004/0001106 A1 | 1/2004 | Deutscher et al. |
| 2006/0156246 A1 | 7/2006 | Williams et al. |
| 2007/0186006 A1 | 8/2007 | Murray et al. |
| 2008/0071796 A1* | 3/2008 | Ghuneim .............. G06F 16/248 |
| 2008/0126979 A1 | 5/2008 | Abe et al. |
| 2008/0208820 A1* | 8/2008 | Usey .................... G06F 16/313 |
| 2008/0263010 A1 | 10/2008 | Roychoudhuri et al. |

(Continued)

OTHER PUBLICATIONS

Jin et al. "Interactive Querying of Temporal Data Using A Comic Strip Metaphor", IEEE Symposium on Visual Analytics Science and Technology, Oct. 24-29, 2010, pp. 163-170 (Year: 2010).*

*Primary Examiner* — Dino Kujundzic
*Assistant Examiner* — Jianmei F Duckworth
(74) *Attorney, Agent, or Firm* — Perkins Coie LLP; Michael A. Glenn

(57) ABSTRACT

Various kinds of business and other information are tracked in real time. A coherent information visualization, for example as a time line, automatically, simultaneously presents relevant information to a user across multiple dimensions. Tools are provided that allow the user to establish and manipulate multi-dimensional linkages to develop insights into information gathered from multiple domains.

17 Claims, 24 Drawing Sheets

(56) References Cited

U.S. PATENT DOCUMENTS

| | | |
|---|---|---|
| 2008/0297513 A1 | 12/2008 | Greenhill et al. |
| 2009/0187849 A1 | 7/2009 | Rhee et al. |
| 2009/0199113 A1 | 8/2009 | McWhinnie et al. |
| 2009/0216775 A1 | 8/2009 | Ratliff et al. |
| 2009/0249290 A1* | 10/2009 | Jenkins ................ G06Q 10/063 717/109 |
| 2010/0049847 A1 | 2/2010 | Muret et al. |
| 2010/0121707 A1 | 5/2010 | Goeldi et al. |
| 2010/0175006 A1 | 7/2010 | Li et al. |
| 2010/0262995 A1 | 10/2010 | Woods et al. |
| 2010/0299279 A1 | 11/2010 | Davidson et al. |
| 2011/0004071 A1 | 1/2011 | Faiola et al. |
| 2011/0010624 A1 | 1/2011 | Vanslette et al. |
| 2011/0016123 A1 | 1/2011 | Pandey et al. |
| 2011/0040760 A1* | 2/2011 | Fleischman .......... H04N 21/812 707/737 |
| 2011/0047095 A1 | 2/2011 | Cushing et al. |
| 2011/0193704 A1 | 8/2011 | Harper et al. |
| 2011/0214090 A1 | 9/2011 | Yee et al. |
| 2012/0059664 A1 | 3/2012 | Georgiev et al. |
| 2012/0120078 A1 | 5/2012 | Hubbard et al. |
| 2012/0221589 A1* | 8/2012 | Shahar ................. G06F 16/248 707/E17.014 |

\* cited by examiner

MULTI-DIMENSIONAL VISUALIZATION OF TEMPORAL INFORMATION

CROSS REFERENCE TO RELATED APPLICATIONS

This application is a continuation of U.S. patent application Ser. No. 13/338,170, filed on Dec. 27, 2011, which claims priority to U.S. provisional patent application Ser. No. 61/427,961, filed on Dec. 29, 2010, each of which is incorporated by reference herein in its entirety.

BACKGROUND OF THE INVENTION

Technical Field

The invention relates to the organization, presentation, and use of information. More particularly, the invention relates to multi-dimensional visualization of temporal information.

Description of the Background Art

The field of information visualization has emerged "from research in human-computer interaction, computer science, graphics, visual design, psychology, and business methods. It is increasingly applied as a critical component in scientific research, digital libraries, data mining, financial data analysis, market studies, manufacturing production control, and drug discovery." See, Benjamin B. Bederson and Ben Shneiderman (2003); *The Craft of Information Visualization: Readings and Reflections*, Morgan Kaufmann ISBN 1-55860-915-6.

Information visualization presumes that "visual representations and interaction techniques take advantage of the human eye's broad bandwidth pathway into the mind to allow users to see, explore, and understand large amounts of information at once. Information visualization is focused on the creation of approaches for conveying abstract information in intuitive ways." See, James J. Thomas and Kristin A. Cook (Ed.) (2005); *Illuminating the Path: The R&D Agenda for Visual Analytics*, National Visualization and Analytics Center. p. 30.

Information visualization insights are being applied in areas such as, scientific research, digital libraries, data mining, financial data analysis, market studies, manufacturing production control, and crime mapping.

There is a vast and rapidly growing amount of time-based data available on networks, but no simple, standard way of viewing, sharing, and presenting it. State of the art information visualization is relatively unsophisticated in connection with such multi-dimensional, temporal information. Further, state of the art information visualization is relatively static, lacking both the ability to provide real time information transforms and the ability to establish and manipulate multi-dimensional linkages to develop insights into information gathered from multiple domains.

SUMMARY OF THE INVENTION

An embodiment of the invention addresses that fact that there is a large amount of information available to individuals and organizations that could be valuable if it were organized in a useful way. Heretofore, there has not been a simple way to track and organize this information. Embodiments of the invention present a new way to track all kinds of business and other information in real time. An embodiment of the invention provides a coherent information visualization, for example as a time line, that automatically, simultaneously presents relevant information to a user across multiple dimensions. An embodiment of the invention provides tools that allow the user to establish and manipulate multi-dimensional linkages to develop insights into information gathered from multiple domains.

DETAILED DESCRIPTION OF THE INVENTION

An embodiment of the invention addresses that fact that there is a large amount of information available to individuals and organizations that could be valuable if it were organized in a useful way. Heretofore, there has not been a simple way to track and organize this information. Embodiments of the invention present a new way to track all kinds of business and other information in real time. An embodiment of the invention provides a coherent information visualization, for example as a time line, that automatically, simultaneously presents relevant information to a user across multiple dimensions and from multiple domains. An embodiment of the invention provides tools that allow the user to establish and manipulate multi-dimensional linkages to develop insights into information gathered from multiple domains.

Terminology

For purposes of the discussion herein, the following terms shall have their accompanying meanings:

A strip is a single timeline.

A strip page is a unique URL containing one or more strips.

A strip tab is a subset of a strip page that contains one or more strips.

A source is a strip data source.

A topic is a subject of interest to a strip user.

A filter filters a data source.

A strip template is a container for data in which no sources, topics, or filters are defined.

A strip developer is a person or entity that uses the strip API to create custom strip configurations.

A widget window provides alternate ways, e.g. a non-timeline metaphor, for displaying strip source data, for example, a world map.

Discussion

Figure 1:
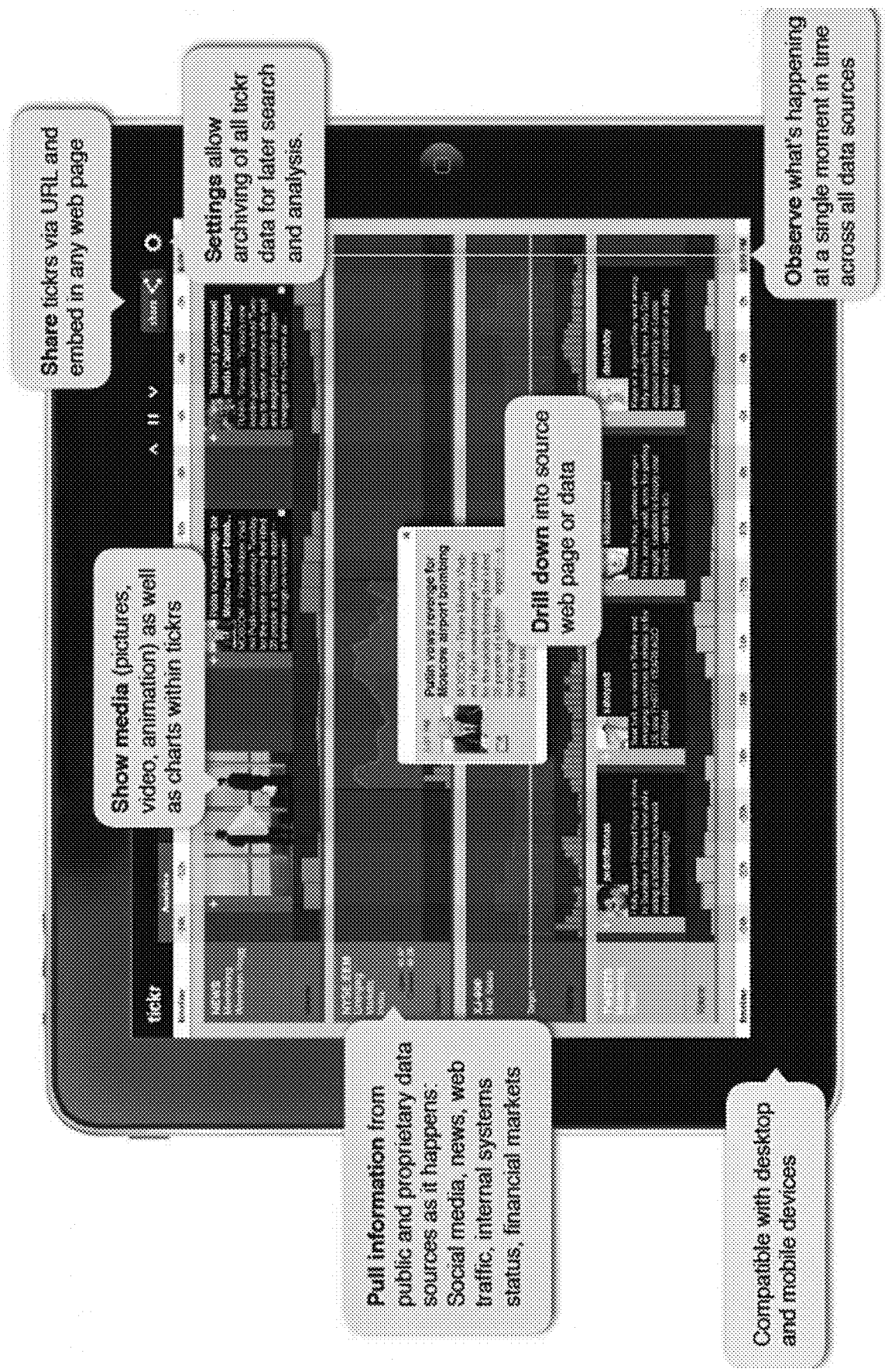
FIG. 1 is a schematic representation of a display showing a multi-dimensional visualization of temporal information according to the invention.

FIG. 1 is a schematic representation of a display showing a multi-dimensional visualization of temporal information. In FIG. 1, a series of strips are arranged along a timeline, each strip providing information of a different type and/or from a different source, but related in some useful way to the information in each of the other strips. Key features of this embodiment include the compatibility of the system herein disclosed with any device, the integration of all media within the strip, the ability to drill down in an information source which is the information basis for the strip, the ability to observe what is happening at a selected moment in time across multiple dimensions for comparative analysis (derivative information), as well as the ability to provide a view of such information sources over an extended period of time (integral information), the ability to share displays and to embed them into other data sources, such as Web pages, the provision of a full set of user tools that allow for creation and configuration of strips by non-technical users, as well as archival tools that may be used to save a display for later search and analysis, and the ability to pull information from public and proprietary data sources as it happens, using such sources as social media, news, Web traffic, marketing and advertising campaign activity, internal systems status, and financial market information.

Strip Creation/Configuration Features

In an embodiment of the invention, two methods are provided for strip creation and configuration: a simple UI, and a programmatic approach (API).

The simple UI approach comprises a library of pre-created links to data sources and a library of pre-created strip templates, where the system matches a template to a data source link. In this embodiment, a user chooses from pre-defined sources and templates or creates his own strip by such operations as define/name strips, define/name tabs, and define/name dynamic screens. The UI allows the user to set viewing/sharing privileges, set scroll function/scroll rate, set timeline display duration, and set archiving parameters.

The programmatic access/control approach is provided for strip developers to define and configure custom strips. The API allows the user to, for example, create new strip templates, program a widget window, set creation/sharing/viewing privileges, and set-up private hosting.

Strip Template Types

In an embodiment, strip templates include event timelines, which incorporate, for example, social media (text pictures video animation); news media, such as text, pictures, video, and animation; IT network events, financial transactions, Web traffic/events, including Website activity and ad/marketing campaign tracking; calendar events; and collaboration events, such as project management and real-time messaging.

Strip templates also include graphs, which may comprise any type of time-based graph and/or a combination event timeline/media/+graph.

Presentation/Publishing

In an embodiment, data sources are harmonized to allow visual and programmatic comparison of data from different data sources at a single moment in time. The invention comprehends a platform-independent, browser-based presentation on desktop and mobile devices (device-independent). Strips can be embedded in other Web pages and/or Web services and can be exported to any desired format, such as PDF, JPEG, and PPT.

Analysis

An embodiment of the invention organizes strips to compare synchronous events from separate data sources visually or programmatically. This allows analysis with regard to, for example, resource allocation; ROI analysis; analysis of collaborative activity; and impact analysis, for example viewing drought vs. commodity prices. The invention includes a drill-down feature that enables users to click on strips to access more detailed data and/or establish a direct two-way link to the referring data source. The timescale of single/multiple strips can be adjusted in real-time to support analysis/comparison of events from multiple data sources. Further, strips can be scrolled independently, i.e. asynchronously, to compare events from different time periods visually.

Collaboration

Strips and strip dynamic screens can be shared, subject to sharing privileges, across networks using common Web-based sharing methods, such as emailing a URL. Comments can be attached/embedded on strip timelines. The invention thus comprehends the provision of tools enable a strip user to engage the originator of data via a strip.

Archiving

Any data displayed in a strip can be archived on the strip server. Such archiving provides the user with the ability to travel back in time in strip timelines and perform visual or programmatic analysis of past events. Archiving also enables travel forward in time to view scheduled future events for visual or programmatic analysis.

Search

Strip data can be searched using, for example, keywords, data parameters such as patterns and thresholds, and time period.

Exemplary Embodiment

Figure 2:
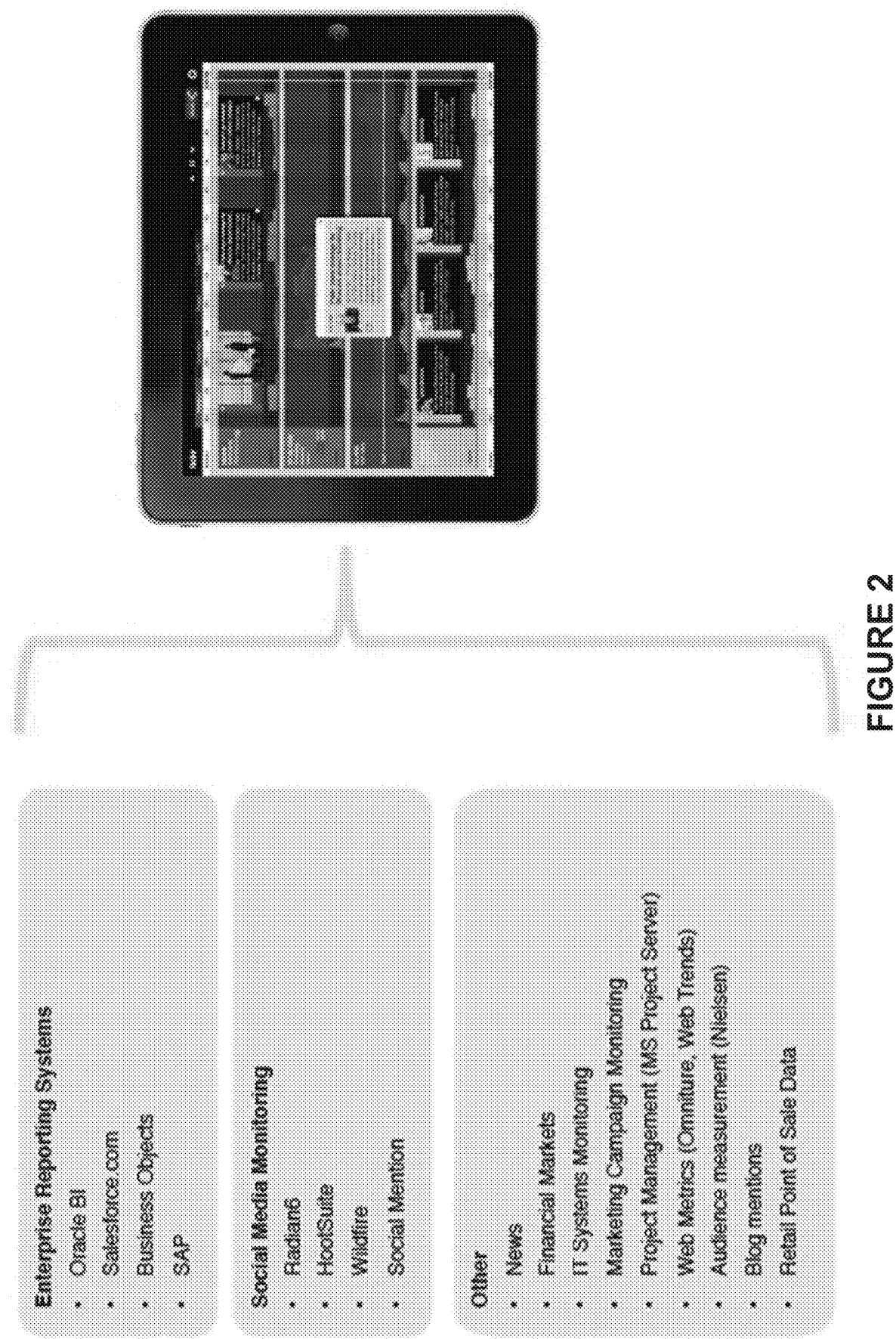
FIG. 2 is a schematic representation of a display showing sources of information for multi-dimensional visualization of temporal information according to the invention.

FIG. 2 is a schematic representation of a display showing sources of information for multi-dimensional visualization of temporal information.

Figure 3:
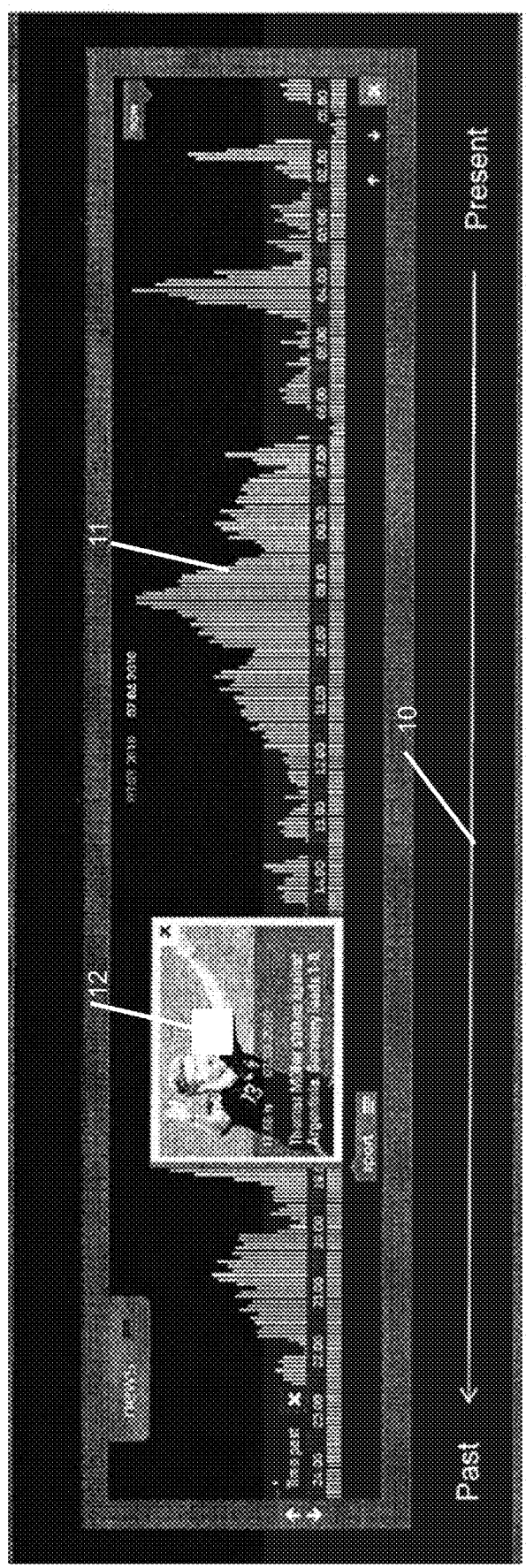
FIG. 3 is a schematic representation of a strip according to the invention.

FIG. 3 is a schematic representation of a strip. As discussed above, a strip is a modular format for displaying time-based data. Such data comprehends a variable time period 10. A strip is data source independent, displays such forms of information as graphs 11, pictures 12, video, text, and the like, is dynamically updated, and can be shared as a URL. Media, such as photos, text, audio, and video, can be integrated with quantitative data, shown in FIG. 3 as a graph, in a time-synchronous manner. Examples of strip data sources include (see FIG. 2) proprietary sources, such as business performance analytics, enterprise network activity, customer and audience behaviors, metrics and scorecard outputs, and enterprise data sources, such as Oracle BL, SharePoint, Excel, Salesforce.com data, Cast Iron Systems, and Web Site Analytics; and public sources, such as search engines, news providers, RSS feeds, financial market data, including market activity and sentiment, most popular data, such as entertainment information, postings, and blog entries, and social media, such as Twitter® and Facebook®.

Figure 4:
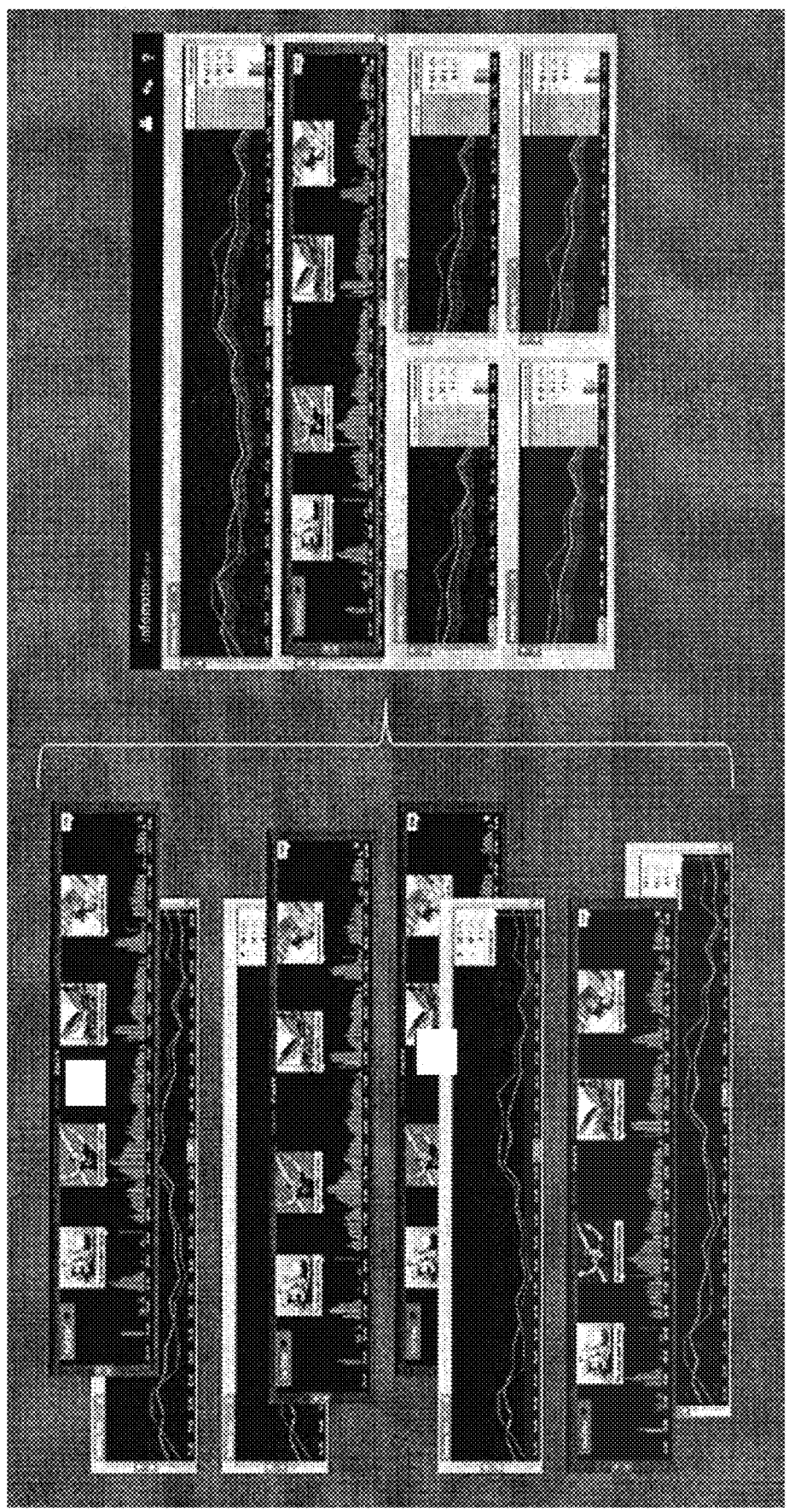
FIG. 4 is a schematic representation showing that preconfigured strips can be selected from a library according to the invention.

FIG. 4 is a schematic representation showing that pre-configured strips can be selected from a library. In the library environment, a plurality of pre-made strip templates can be combined with a plurality of pre-created data source links. Multiple strips can be nested inside of a summary strip that shows an aggregated view of several strip data sources. For example, 50 US state strips can feed data to one USA summary strip. Further, a function can be applied to data within various strips to produce a resulting derived strip that can be displayed along with the data source strips. Such function can comprise any mathematical functions, Boolean functions, and the like. Strips can also be used to identify causation between events. Thus, this embodiment allows a user to see how an event shown in a first strip affects/causes another event in at least a second strip.

Figure 5:
FIG. 5 is a schematic representation showing that strips can be combined together on dynamic screens according to the invention.

FIG. 5 is a schematic representation showing that strips can be combined together on dynamic screens. Strips can scroll vertically as with movie credits. Data is harmonized so that data from multiple data sources at a single point in time can be observed and visually or programmatically compared. Left-hand labels 31-34 show topics and sources, as well as data parameters, such as a vertical axis that shows a time scale for a graph.

Figure 6:
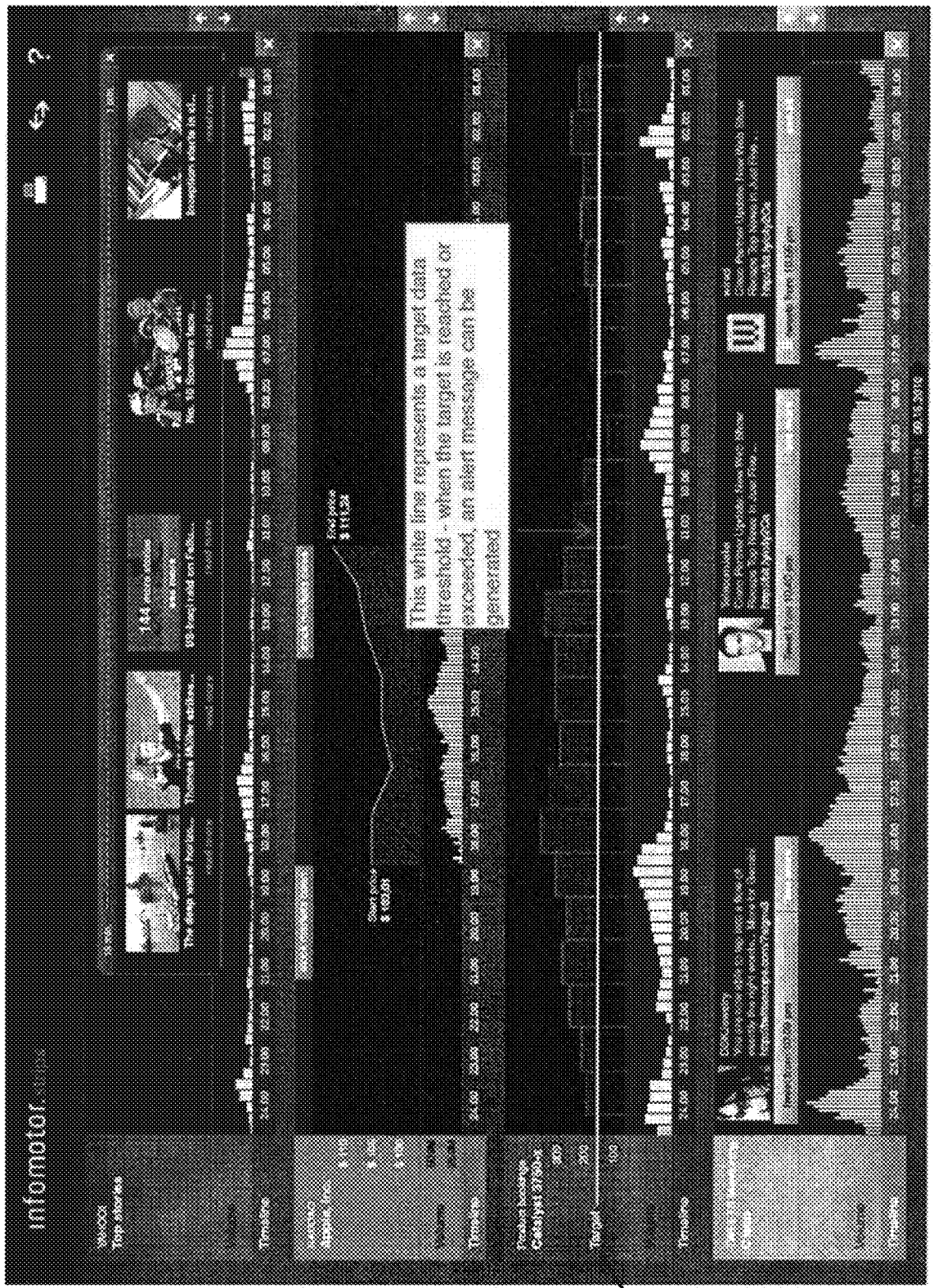
FIG. 6 is a schematic representation that shows a white line which represents a target data threshold according to the invention.

FIG. 6 is a schematic representation that shows a white line 41 which represents a target data threshold. When the target is reached or exceeded, an alert message can be generated. Thus, in an embodiment alerts in the form of notification messages are automatically dispatched when a target threshold is reached or exceeded. These messages may be addressed to humans or to machines. In the case of machines, an alert message may trigger a machine event. A summary data panel 42 shows current values compared with a selected moment from the past.

Figure 7:
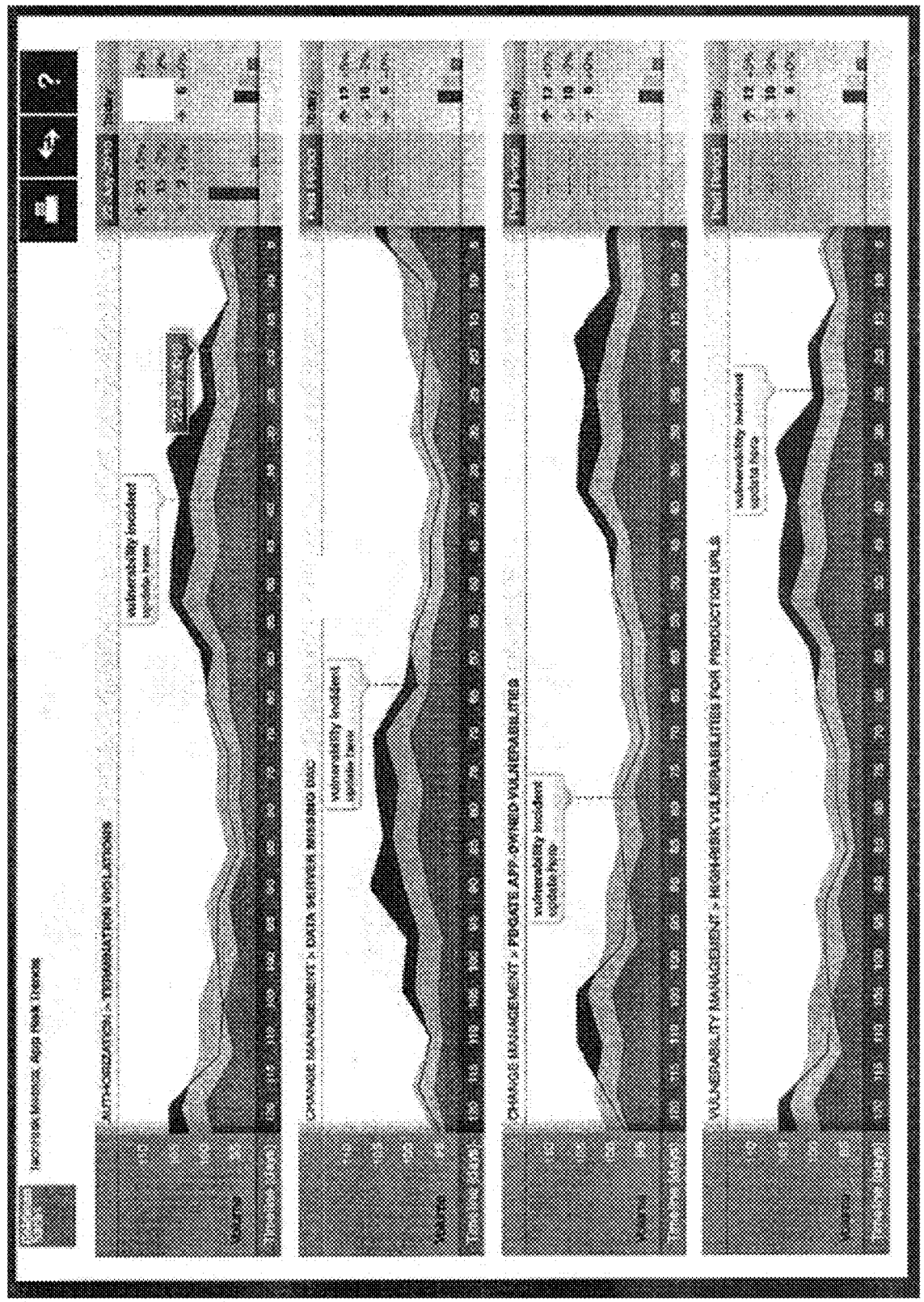
FIG. 7 is a schematic representation that shows incident tracking according to the invention.

FIG. 7 is a schematic representation that shows incident tracking. As shown in FIG. 7, a page of graph strips enables quick visual comparison of the behavior of multiple data sources.

Figure 8:
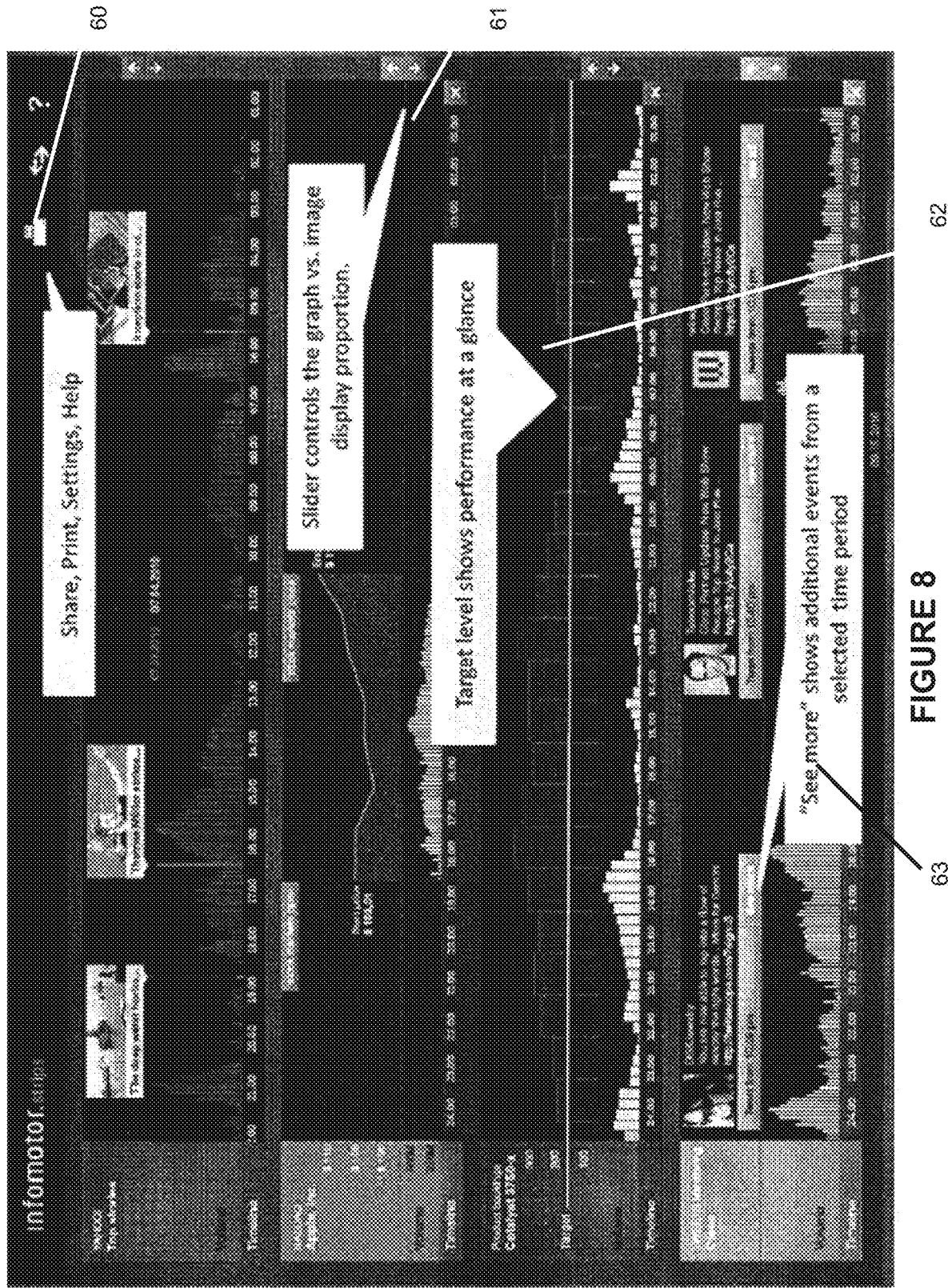
FIG. 8 is a schematic representation that shows elected features which include share, print, settings, and help buttons; sliders that control a graph vs. image display proportion; a target level to show performance at a glance; and a "See More" button that shows additional events from a selected time period, according to the invention.

FIG. 8 is a schematic representation that shows selected features which include share, print, settings, and help buttons 60; sliders that control a graph vs. image display proportion 61; a target level to show performance at a glance 62; and a "See More" button 63 that shows additional events from a selected time period.

Figure 9:
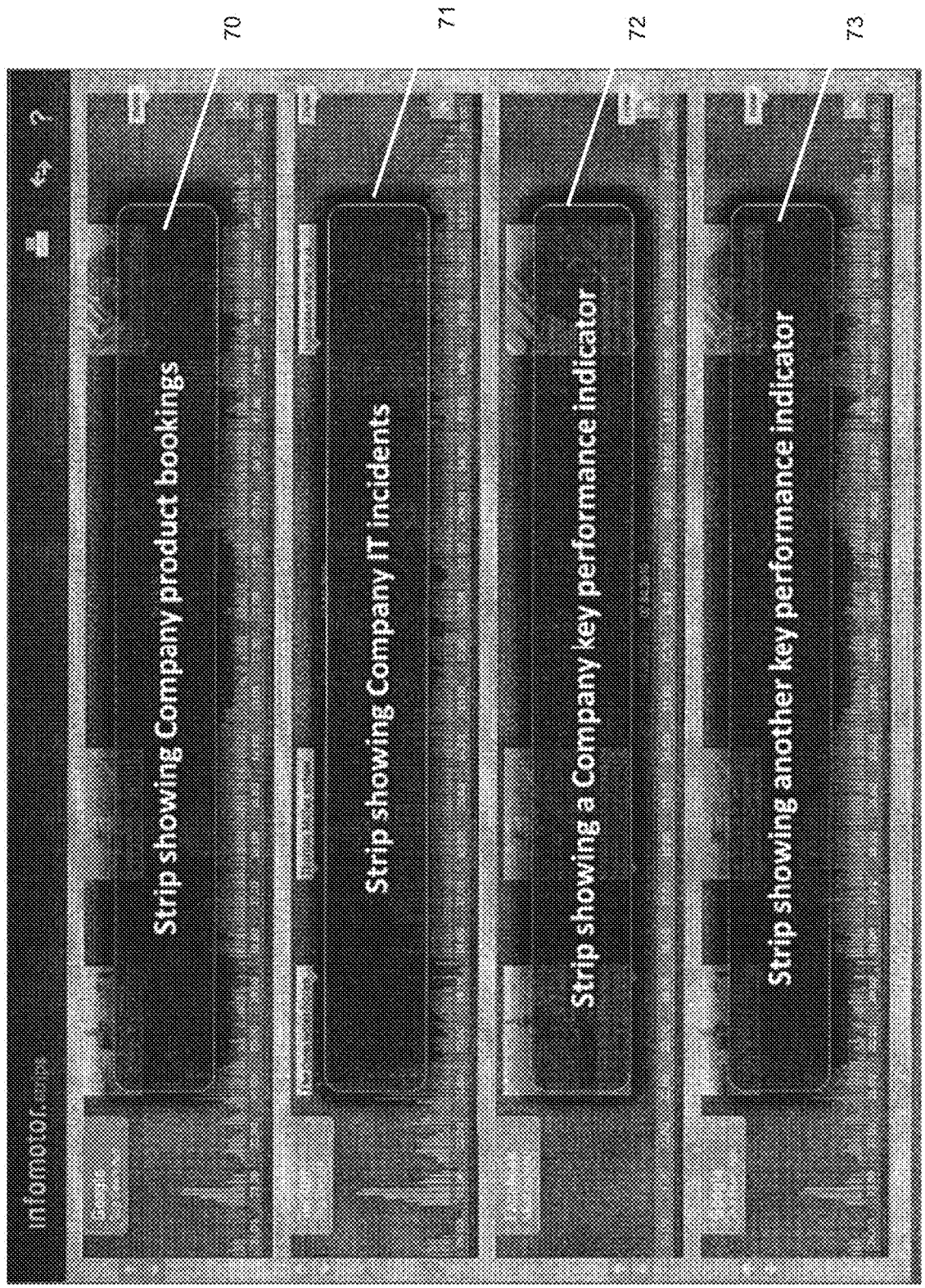
FIG. 9 is a schematic representation of a use case for enterprise metrics and reporting according to the invention.
Figure 10:
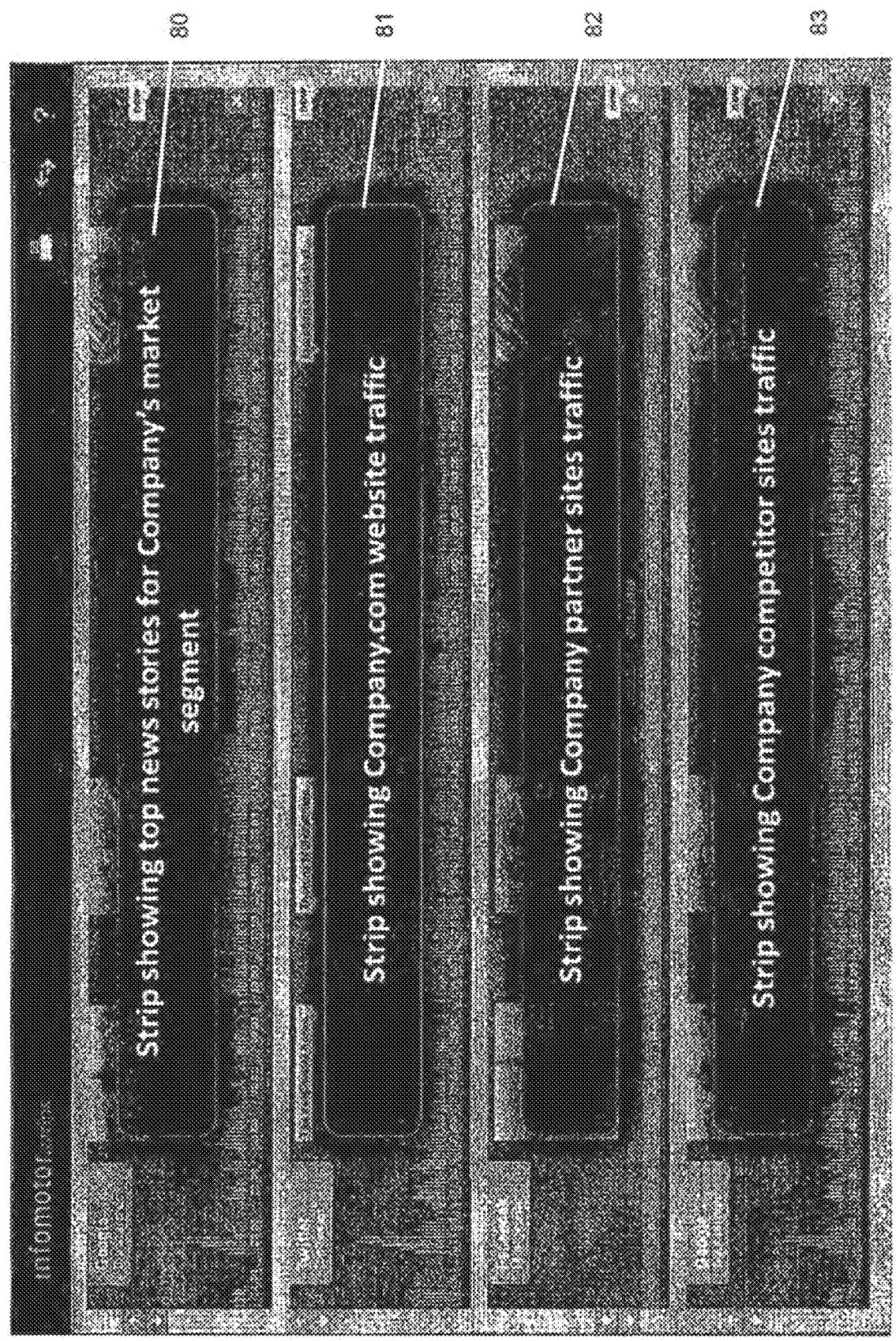
FIG. 10 is a schematic representation of a use case for company-related Web analytics according to the invention.
Figure 11:
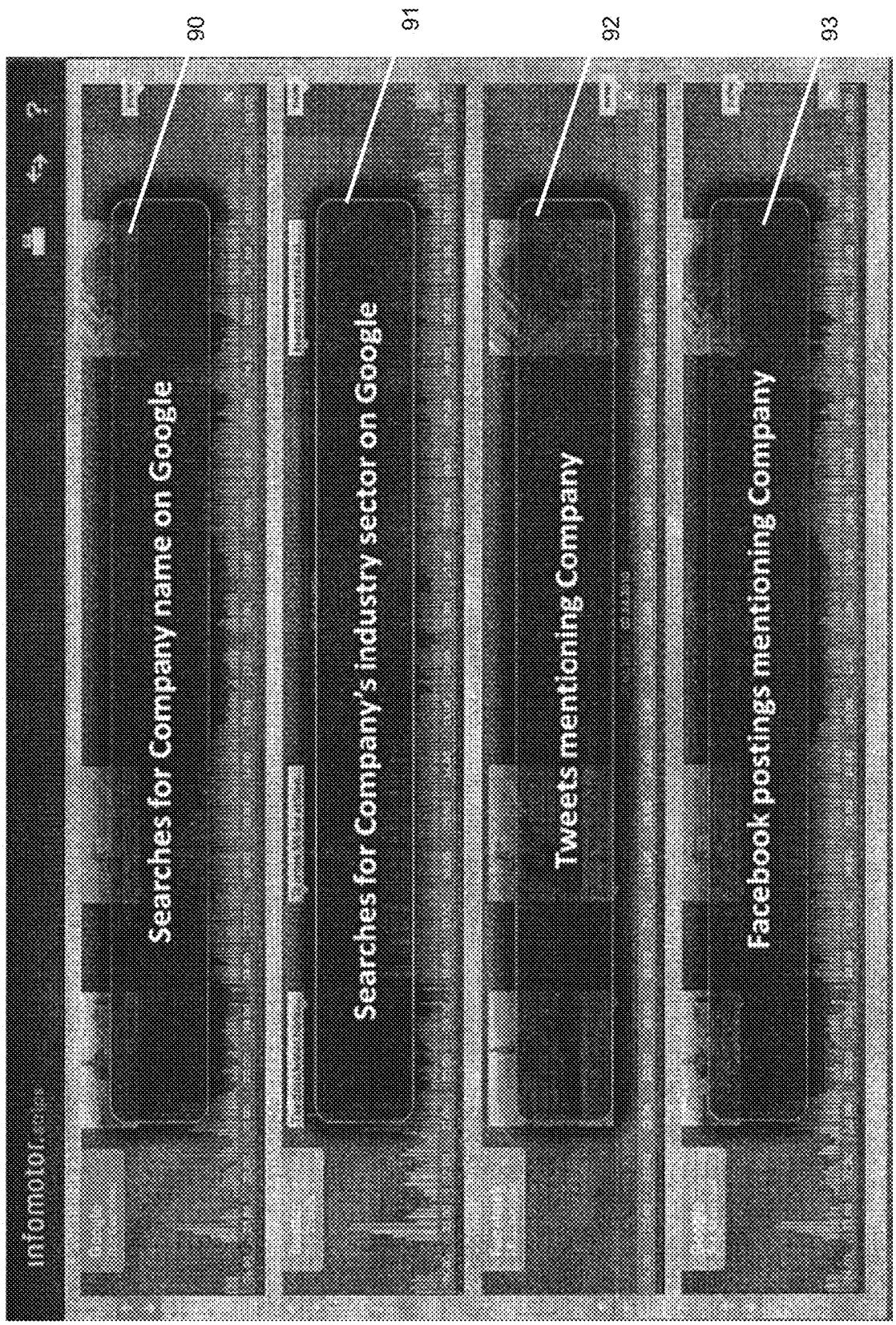
FIG. 11 is a schematic representation of a use case for company-related activity from public data sources according to the invention.

FIGS. 9-11 show various use cases for embodiments of the invention. These figures are provided as examples only. Many other uses are possible with the invention and the use cases shown in FIGS. 9-11 should not be considered limiting to the scope of the invention in any way.

FIG. 9 is a schematic representation of a use case for enterprise metrics and reporting. In FIG. 9, strips are provided that show company bookings 70, company IT incidents 71, a company key performance indictor 72, and other key performance indicators 73.

FIG. 10 is a schematic representation of a use case for company-related Web analytics. In FIG. 10, strips are provided that show top news stories for a company's market segment 80, company website traffic 81, company partner website traffic 82, and company competitor website traffic 83.

FIG. 11 is a schematic representation of a use case for company-related activity from public data sources. In FIG. 11, strips are provided that show search for the company name on Google® 90, searches for the company's industry sector on Google® 91, tweets that mention the company 92, and Facebook® postings that mention the company.

Figure 12:
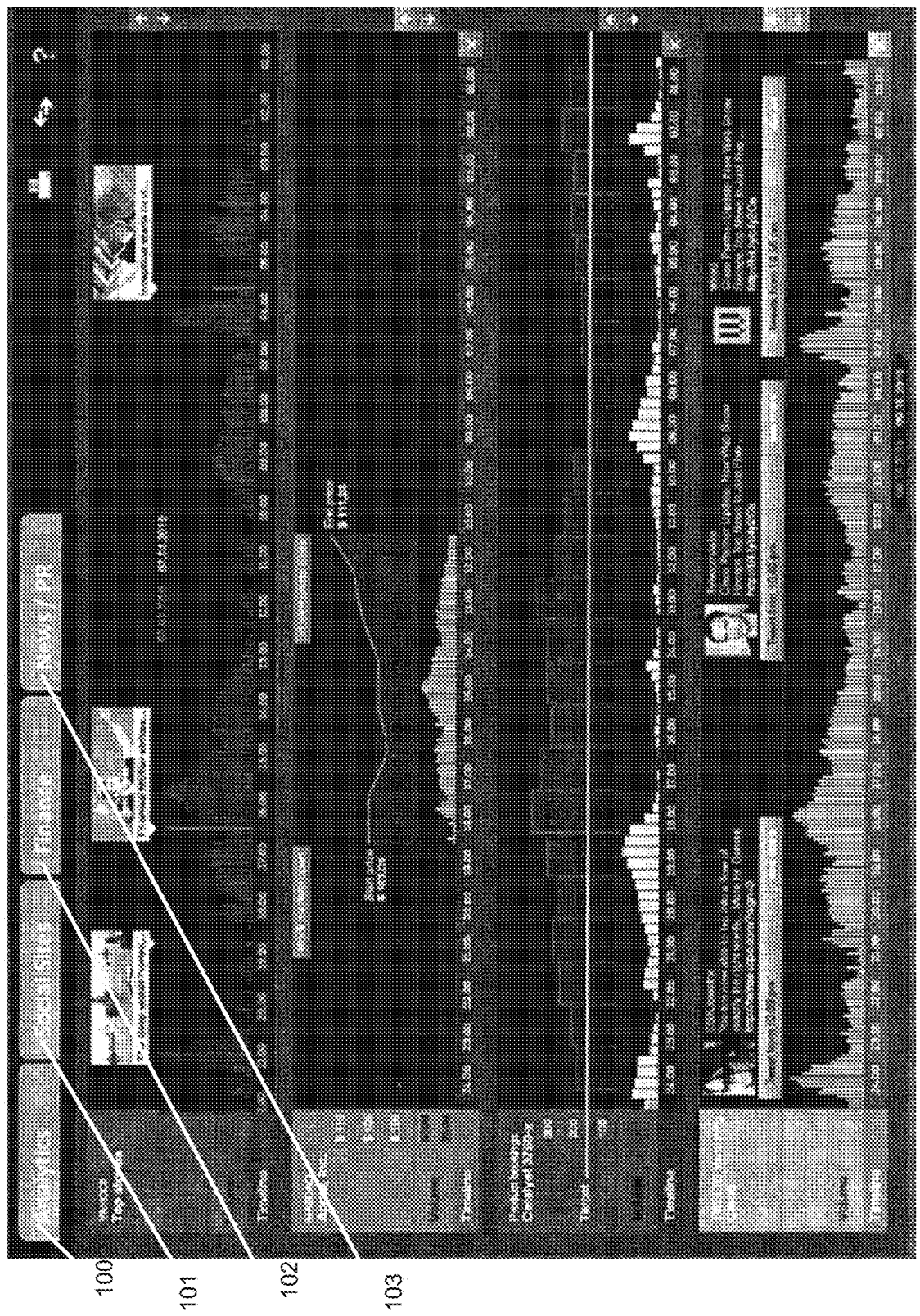
FIG. 12 is a schematic representation that shows dynamic screens of strips grouped under tabs according to the invention.

FIG. 12 is a schematic representation that shows dynamic screens of strips grouped under tabs. In FIG. 12, tabs are provided for analytics 100, social sites 101, finance 102, and news/public relations 103.

Figure 13:
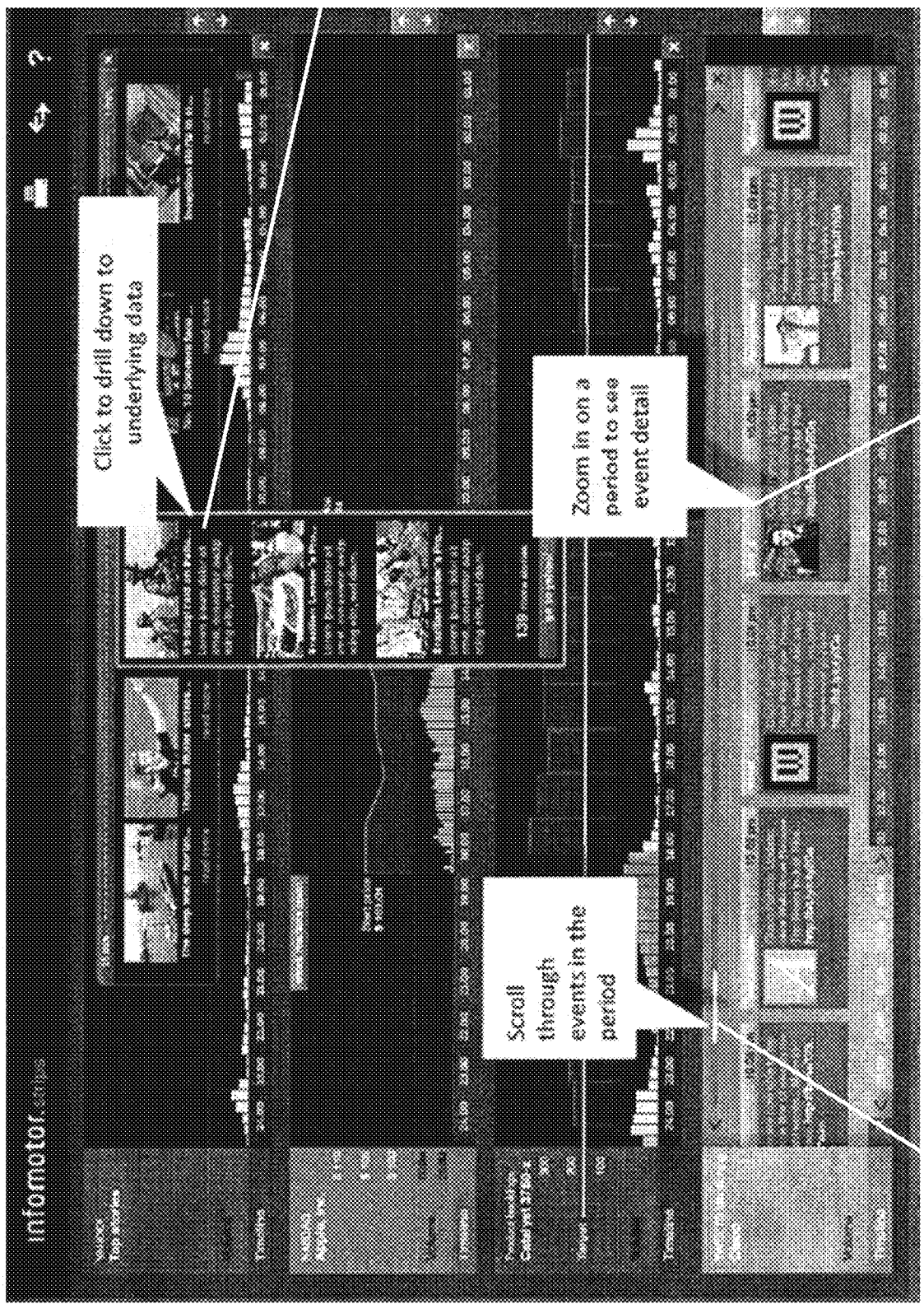
FIG. 13 is a schematic representation that shows navigation according to the invention.

FIG. 13 is a schematic representation that shows navigation, including a button or region 110 that is clicked to drill down to underlying data; a button or region 111 that is clicked to zoom in on a period to see event details; and a scroll function 112 to scroll through events in a time period.

Figure 14:
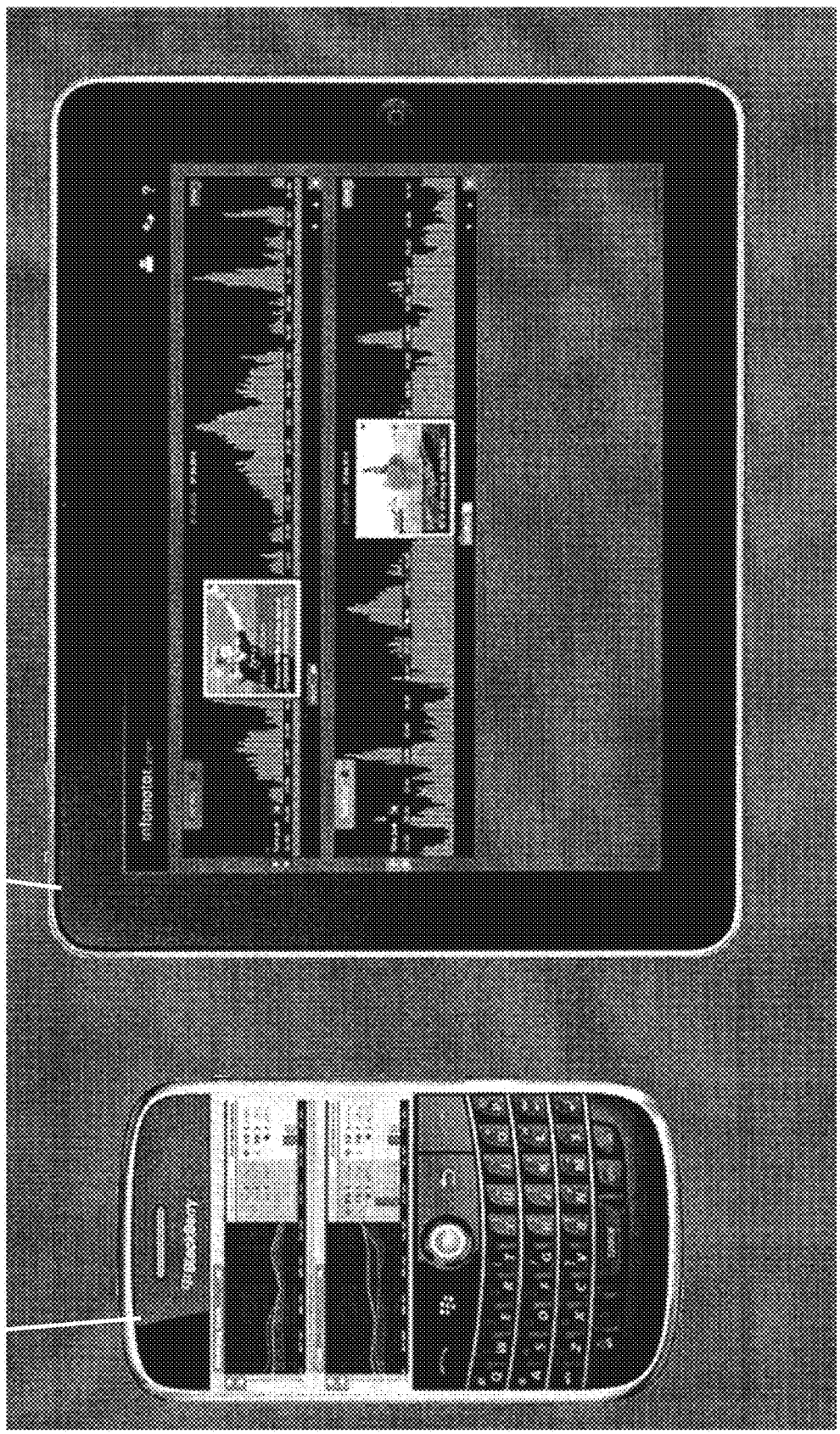
FIG. 14 is a schematic representation that shows that strips are cross platform according to the invention.

FIG. 14 is a schematic representation which shows that strips are cross platform. In FIG. 14, strips are shown displayed on a handheld device 120 and a tablet device 121. However, strips can also be displayed on any other device, such as a desktop or laptop computer, a television, via a projector, a data ticker, and the like.

Figure 15:
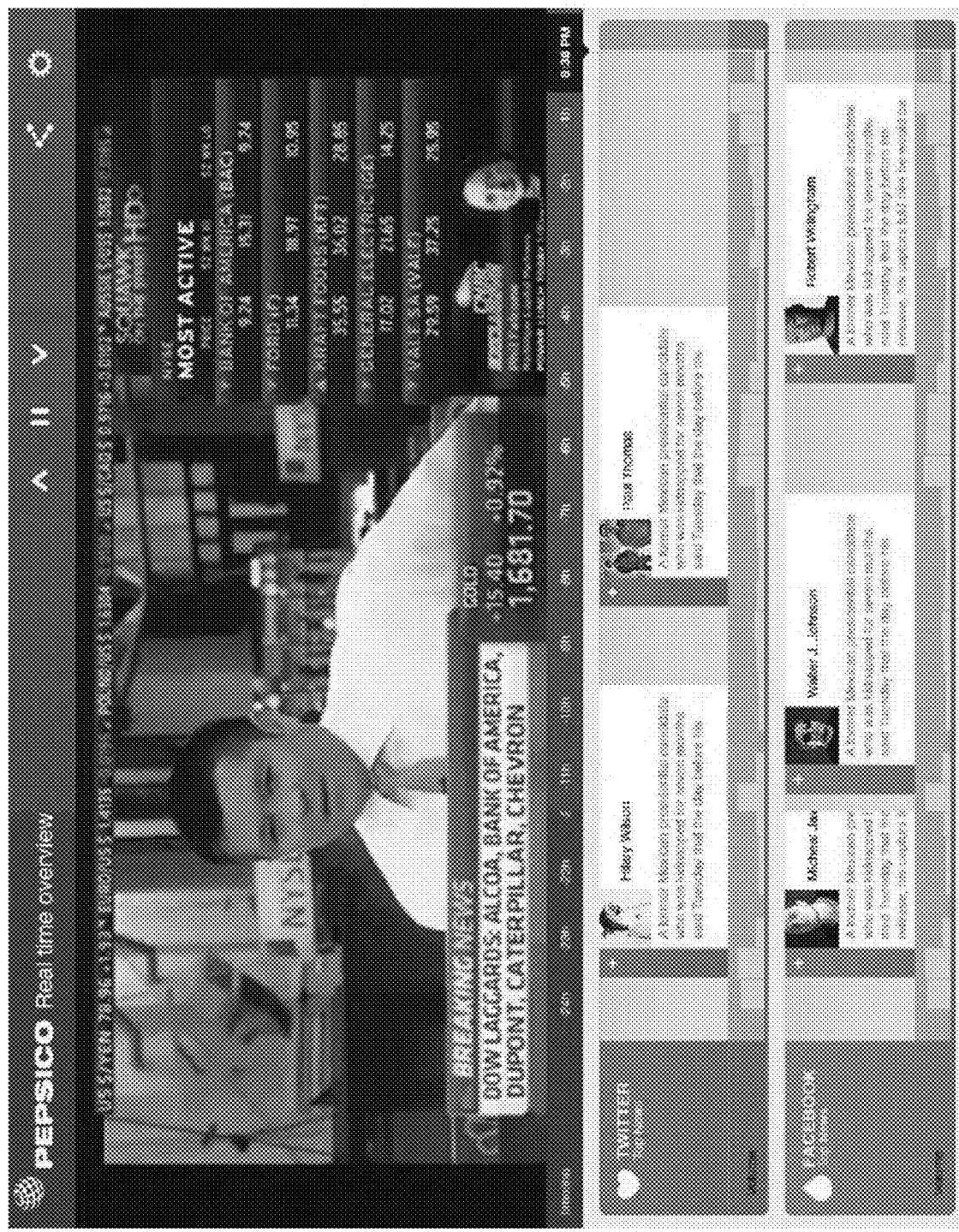
FIGS. 15 and 16 are schematic representations of a widget window according to the invention.
Figure 16:
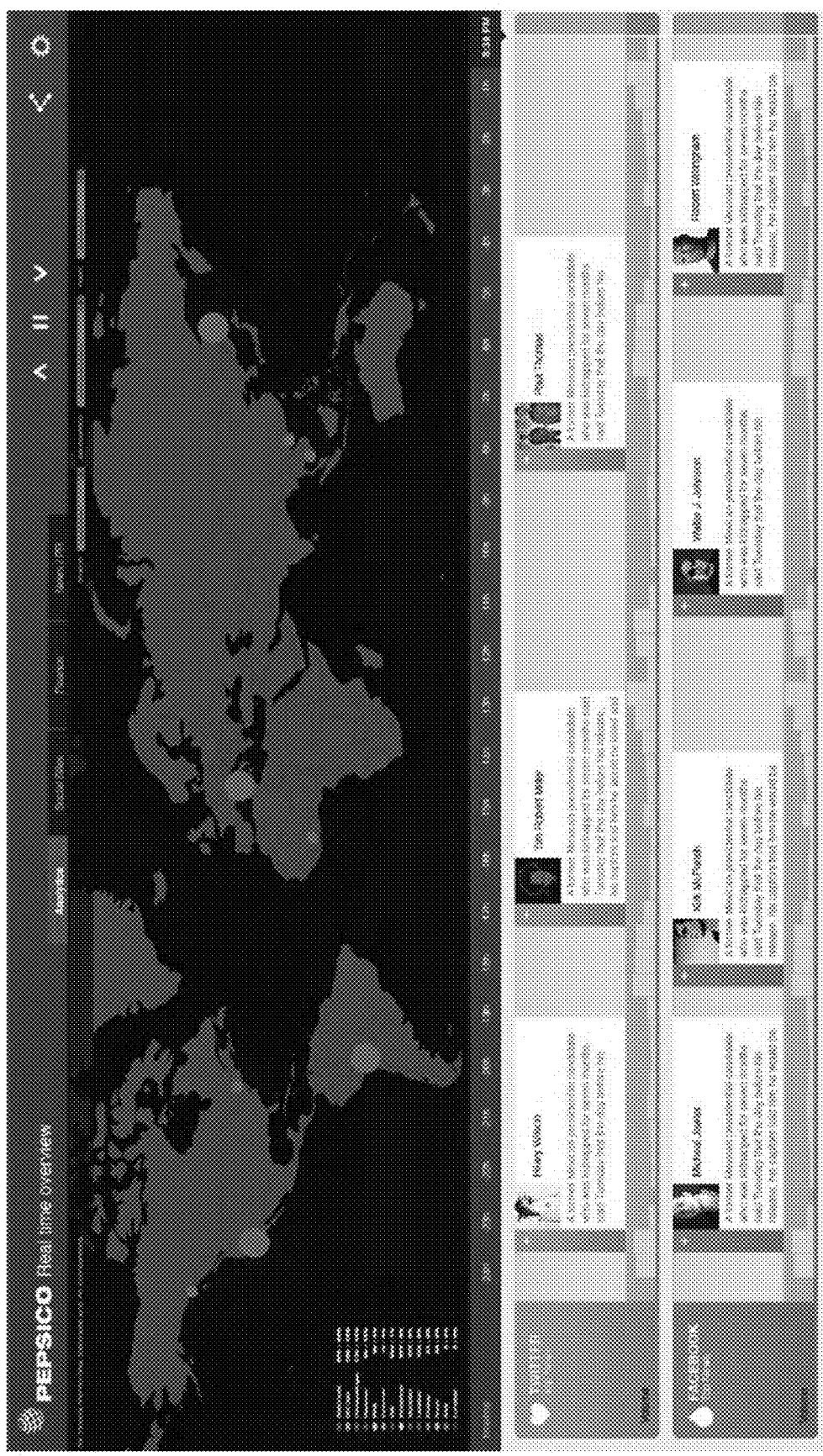

FIGS. 15 and 16 are schematic representations of a widget window. A widget window is a flexible window that displays strip data using an alternative metaphor, for example on a newscast video (FIG. 15) or on a map (FIG. 16). The strips display the data using a timeline metaphor and the map, for example, adds a geographic component to the display, showing where the events occur. It should be appreciated by those skilled in the art that any visual metaphor can be used in this embodiment, For example, one can show video clips in the window that relate to/are driven by the strip timeline content, such as a business newscast, as shown on FIG. 15.

FIGS. 17-21 are a series of screen shots that schematically represent various user operations in connection with the invention disclosed herein.

Figure 17:
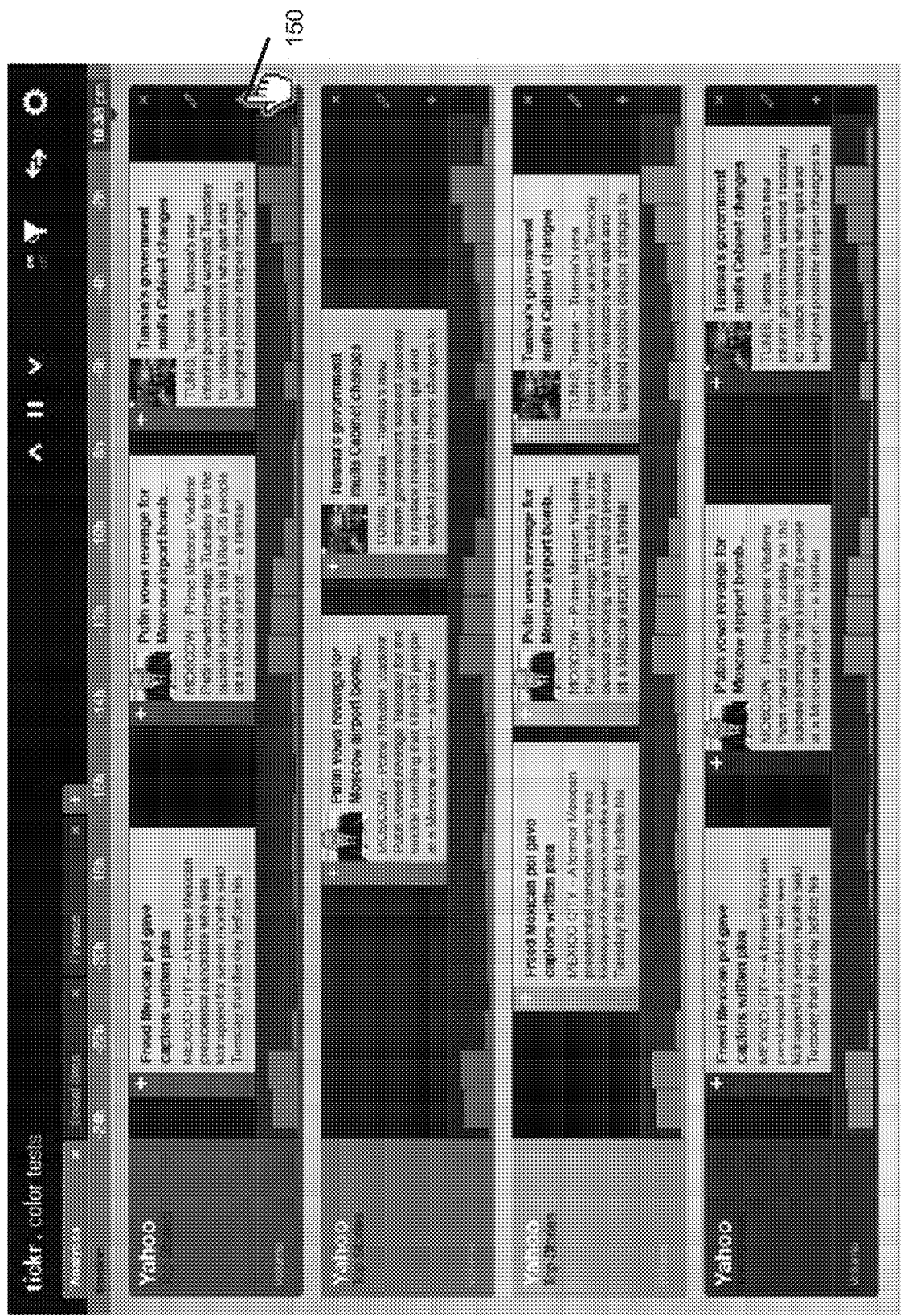
FIG. 17 is a schematic representation that shows user settings for strips according to the invention.

FIG. 17 is a schematic representation that shows user settings for strips. In the example of FIG. 17, a user selects a + symbol 150 to add a strip to the display.

Figure 18:
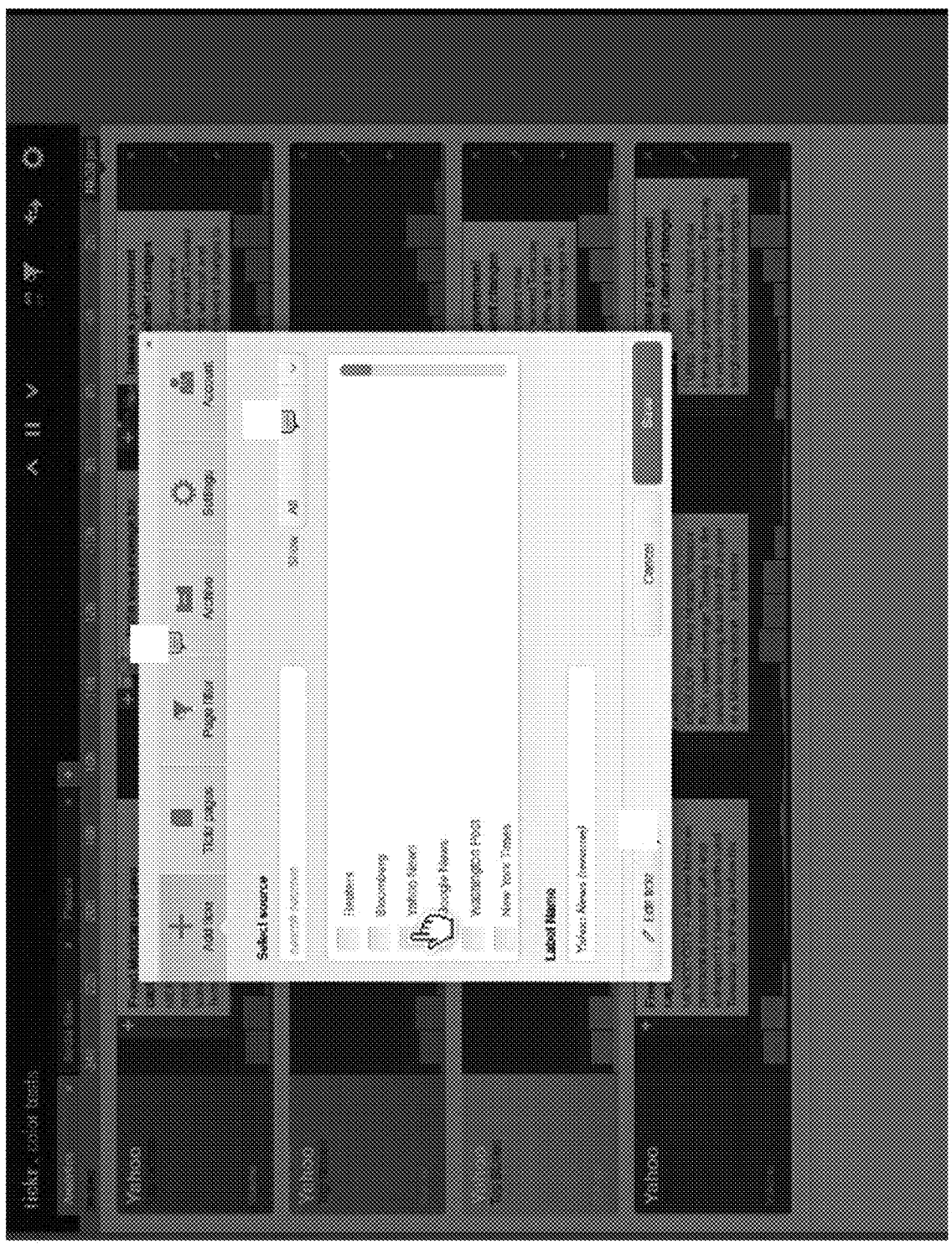
FIG. 18 is a schematic representation of a user dialog for the creation of a strip according to the invention.

FIG. 18 is a schematic representation that shows a selection for adding a strip.

Figure 19:
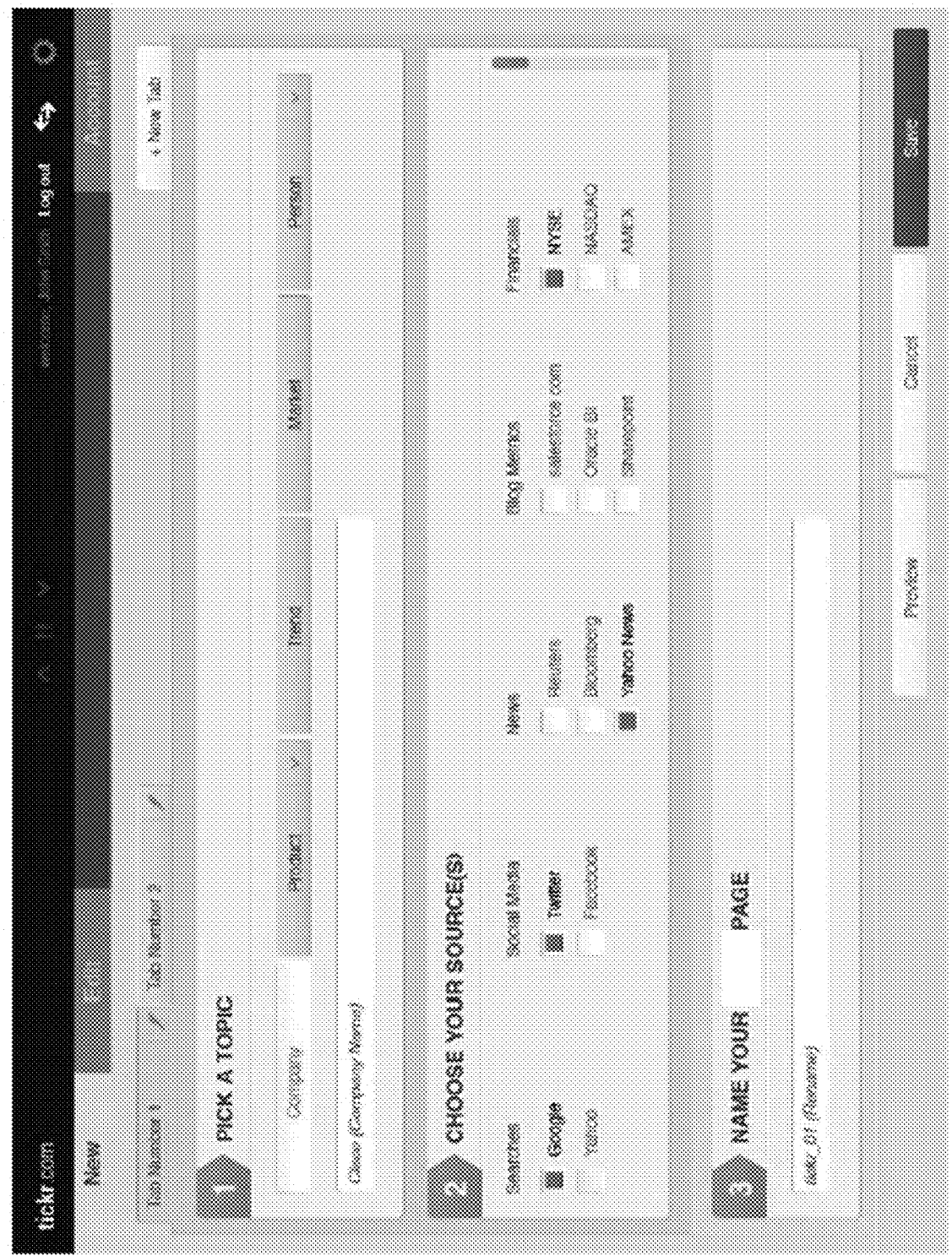
FIG. 19 is a schematic representation that shows user settings for strips according to the invention.

FIG. 19 is a schematic representation of a user dialog for the creation of a strip. In FIG. 19, the user is directed to PICK A TOPIC, CHOOSE YOUR SOURCE(S), and NAME YOUR PAGE. When the user selects SAVE, the strip is created.

Figure 20:
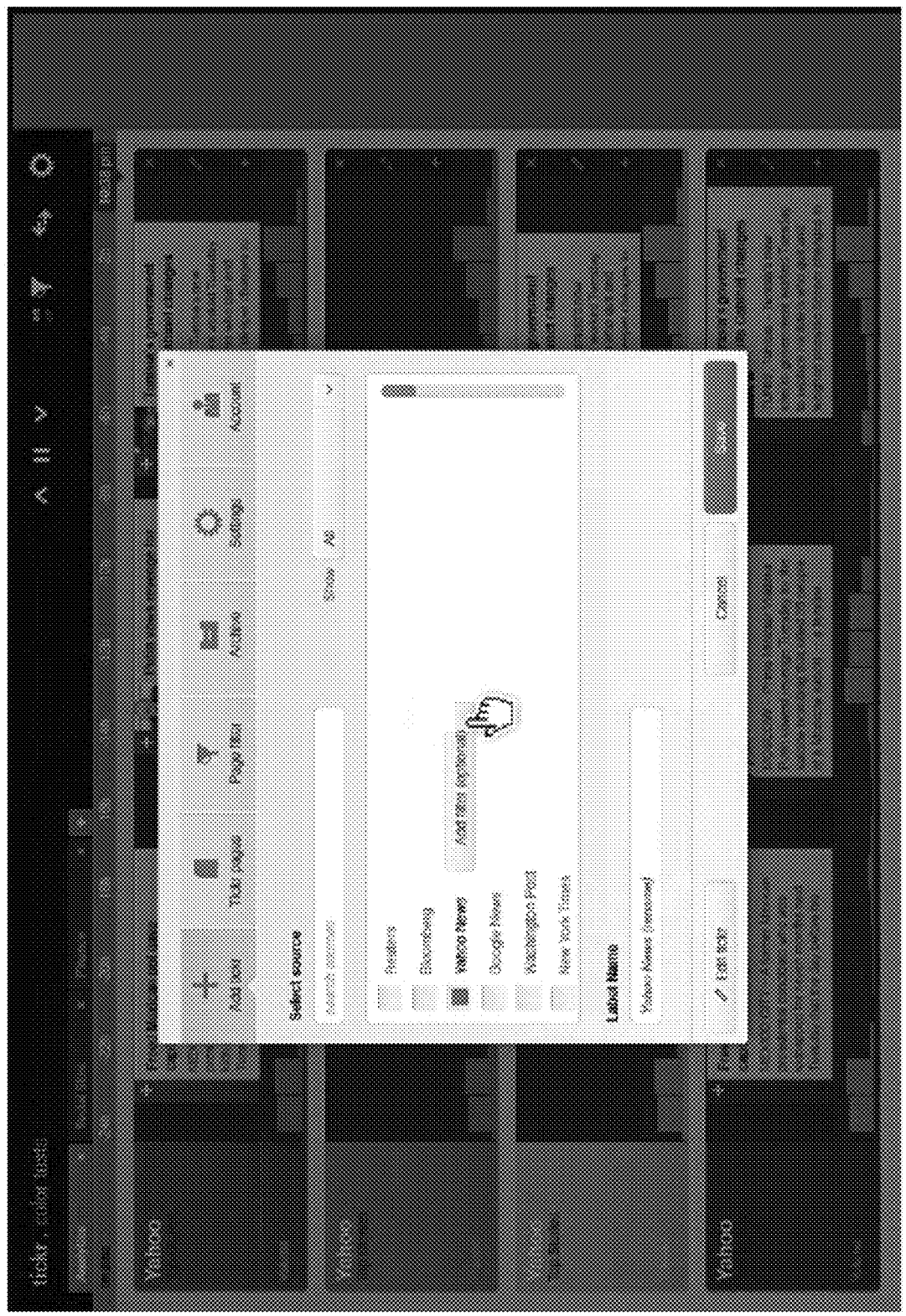
FIG. 20 is a schematic representation that shows user settings for adding a filter to a strip according to the invention.

FIG. 20 is a schematic representation that shows user settings for adding a filter to a strip. Filters are used in a variety of ways. For example, a filter can be invoked to compare two temporal data sets quickly, where one data set is filtered and one data set is unfiltered. One data set might show all stock trades made in the last 24 hours and another filtered data set might show only those stock trades where the price per share was $20 or less. Strips enable dynamic creation and adjustment of filters for quick visual and programmatic comparison of filtered and unfiltered data in the temporal domain.

Figure 21:
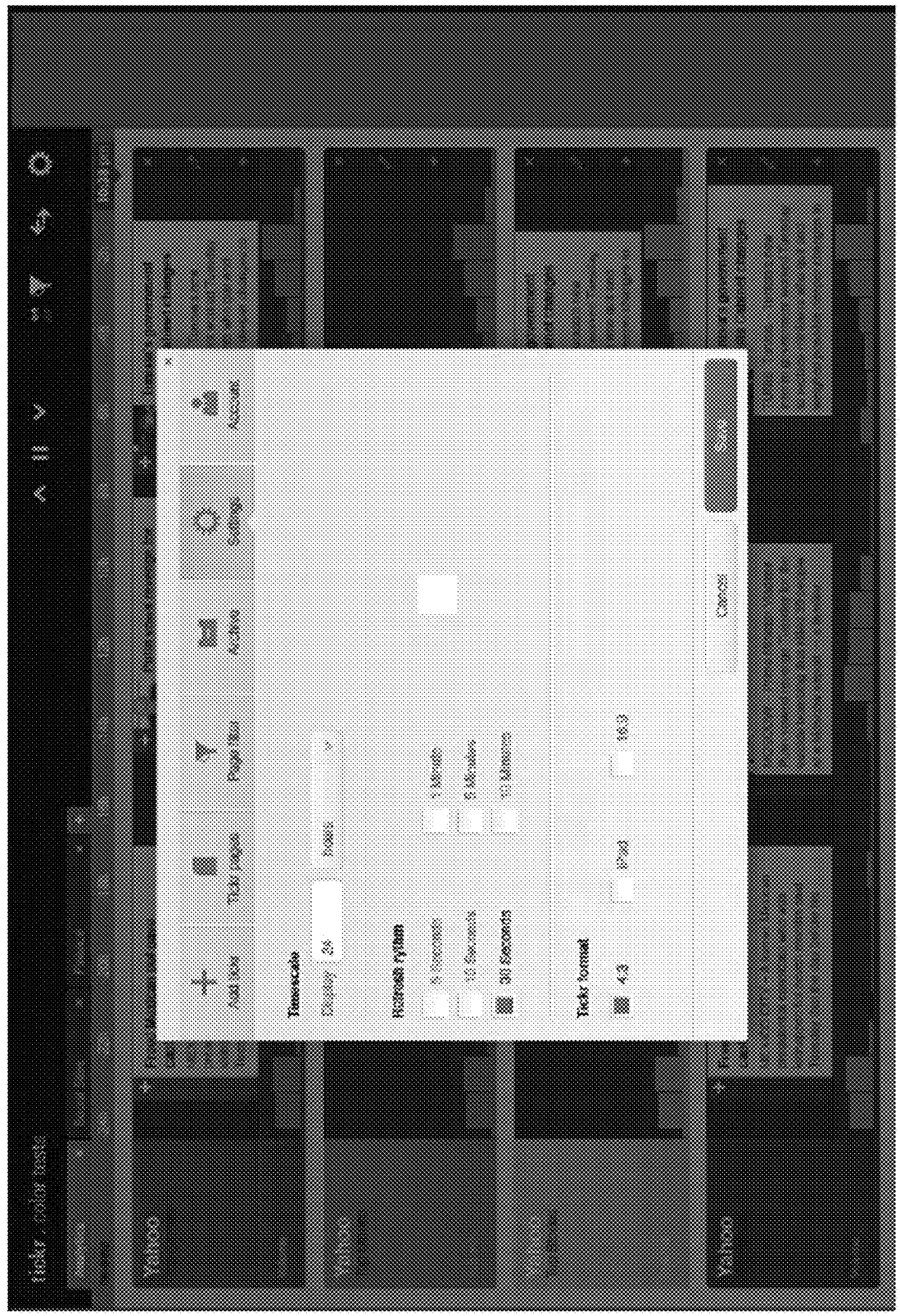
FIG. 21 is a schematic representation that shows user settings for strips according to the invention.

FIG. 21 is a schematic representation that shows user settings for strips.

Architecture

Figure 22:
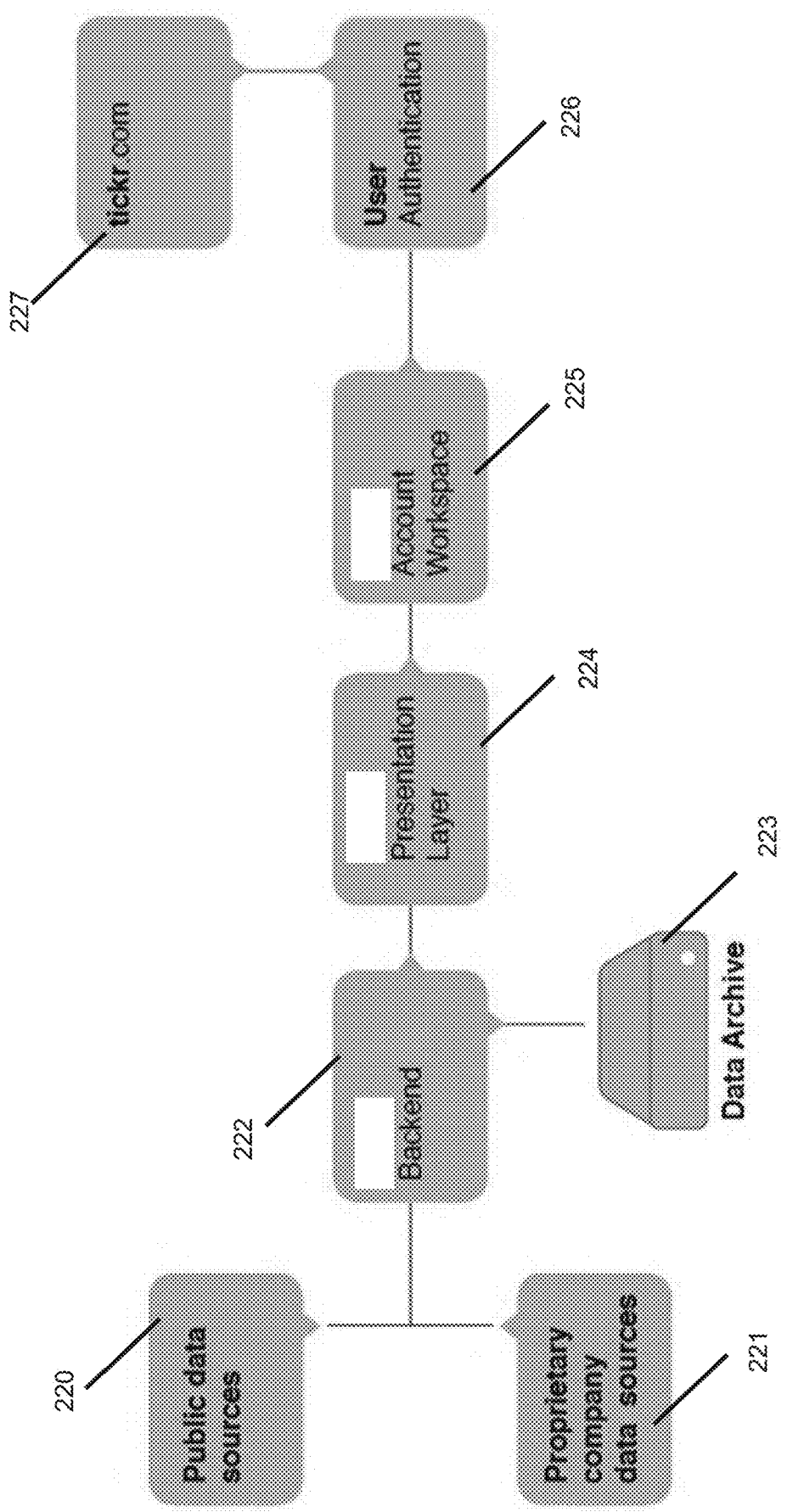
FIG. 22 is a block schematic diagram of an architecture for implementing a presently preferred embodiment of the invention.

FIG. 22 is a block schematic diagram of an architecture for implementing a presently preferred embodiment of the invention. In FIG. 22, public data sources 220 and proprietary company data sources 221 are made available to the system via a backend facility 222. Information is stored in a data archive 223. The information is assembled for a user in a presentation layer 224 and operated upon in an account workspace 225, subject to user authentication 226. User access is via a Web portal 227 in this embodiment, e.g. tickr.com.

Figure 23:
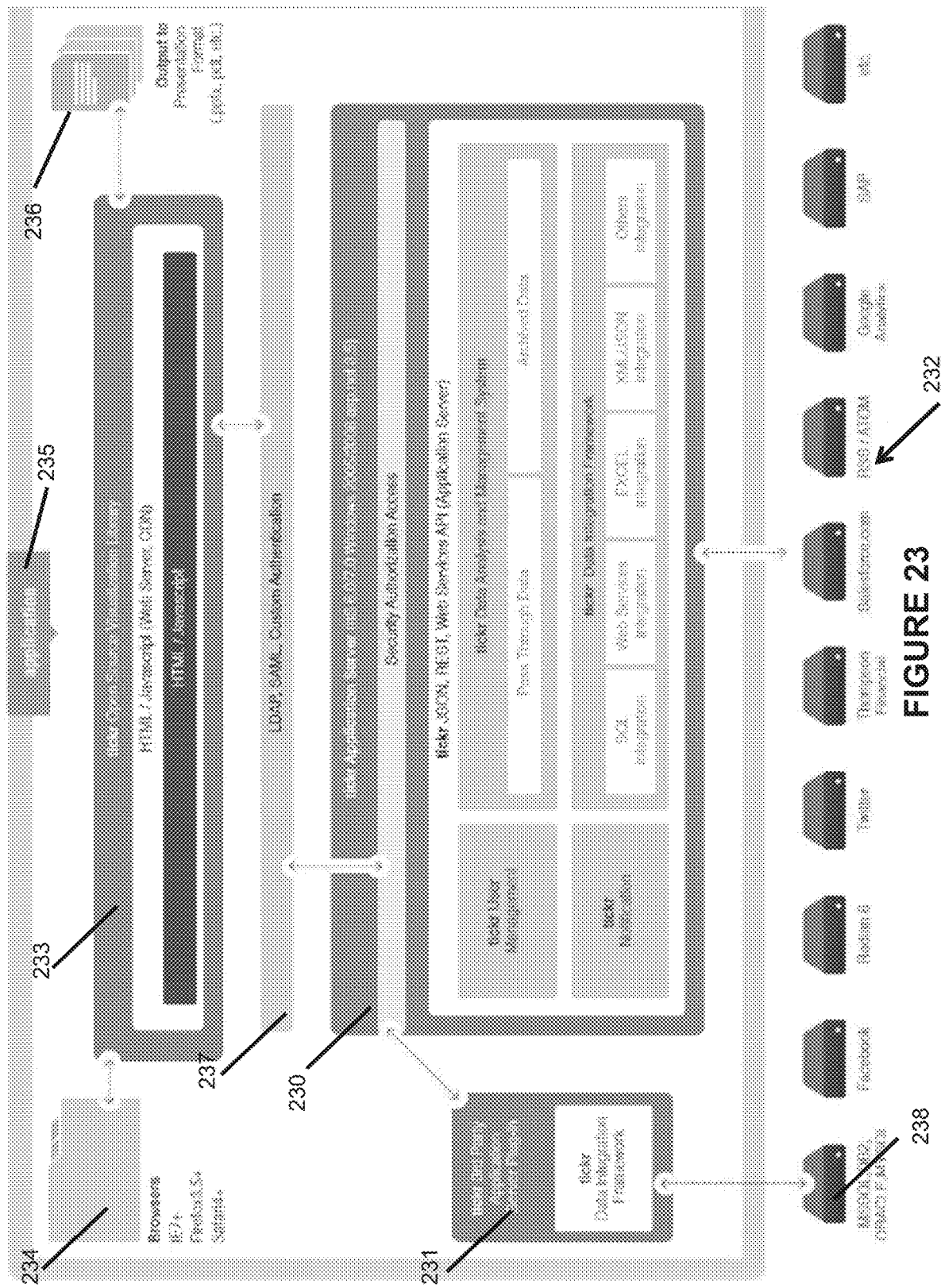
FIG. 23 is a more detailed detail block schematic diagram of an architecture for implementing a presently preferred embodiment of the invention.

FIG. 23 is a more detailed block schematic diagram of an architecture for implementing a presently preferred embodiment of the invention. In FIG. 23, an application server 230 receives information from a plurality of public information sources 232 and/or, via a third party application server plug-in 231, from private information sources 238. A user accesses this information and operates a UI via a user browser 234 running an application 235, such as a script 233. The script also handles output 236 for presentation to the user. A communications layer 237, for example providing LDAP, SAML, and authentication services, handles the exchange of information between the user end of the system and the application server.

The script 233 comprises an open source visualization library that provides HTML/Javascript.

The application server 230 comprises a security authorization facility. An API provides access to user management functions and notification functions. A data analysis and management system handles pass through data and archived data, while a data integration framework provides SQL integration, web services integration, ECEL integration, XML/JSON integration, and other integration. The data integration places data from all sources into a common format along a common scale. This allows presentation of multiple strips on a display in a meaningful fashion.

Data is harmonized for integration by subjecting it to a variety of normalizing operations. For example, volumetric, spatial, and/or temporal operations may be applied to data. Normalized data is created which enables meaningful comparison, analysis, and discovery of trends and anomalies within the strips environment and also through the use of third party analytics tools, such as SAS and Teradata.

Data for multiple strips can be stored in a common data warehouse. Links between strips are created based on pattern recognition or tags embedded in the data which enable one strip to detect related data in another strip, so that strips reconfigure themselves automatically to show related data in adjacent strips.

Computer Implementation

Figure 24:
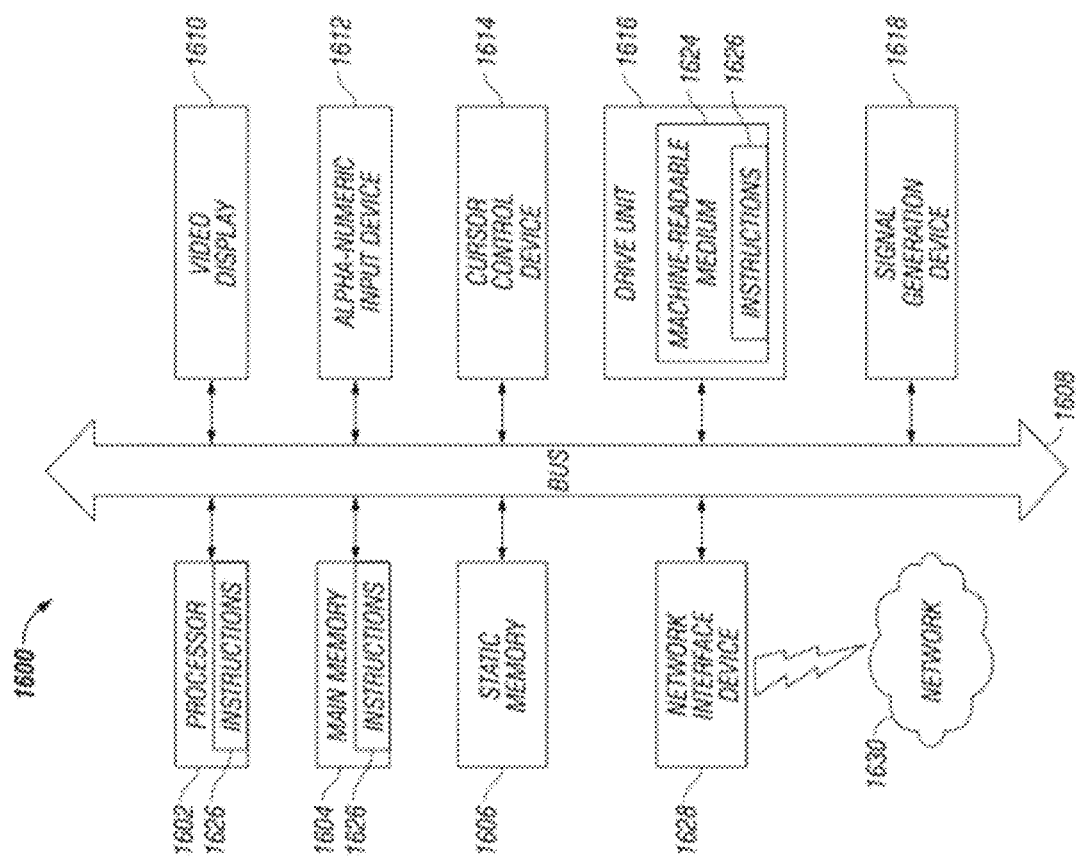
FIG. 24 is a block schematic diagram of a machine in the exemplary form of a computer system within which a set of instructions for causing the machine to perform any one of the herein disclosed methodologies may be executed.

FIG. 24 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM);

magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for creating a visualization that simultaneously presents time-varying information across multiple dimensions, the method comprising:
receiving, by a computing device, input indicative of a selection of multiple independent sources from which to obtain data related to a company;
in response to receiving the input,
automatically acquiring multiple datasets from the multiple independent sources,
wherein each of the multiple datasets includes time-varying information of a different type representing data comprising audio, video, event, activity, or graph that is contiguous across an interval of time;
subjecting the multiple datasets to a normalizing operation that causes the time-varying information included therein to be aligned in a temporal domain;
for each of the multiple datasets, creating a strip from the time-varying information included therein, so as to create multiple strips,
wherein each strip represents a coherent visualization of the time-varying information included in a corresponding one of the multiple datasets across a specified period of time in the form of a line chart or a bar chart, the specified period of time being at least a subset of the interval of time;
integrating social media content within a given strip in a time-synchronous manner such that the social media content is located vertically adjacent to a corresponding portion of the time-varying information represented in the given strip;
displaying the multiple strips in an arrangement to effect a multi-dimensional visualization of the time-varying information included in the multiple datasets, wherein the arrangement aligns the multiple strips along a common timeline and at least two strips of the multiple strips present two different types of time-varying information;
creating programmatic links between the multiple strips through pattern recognition; and
reconfiguring the multiple strips based on the programmatic links, such that related time-varying information is automatically shown in adjacent strips.

2. The method of claim 1, wherein the multiple independent sources include a public data source and a private data source accessed via a third-party plug-in.

3. The method of claim 1, wherein the arrangement of the multiple strips enables visual and programmatic comparison of time-varying information from different sources at a single moment in time.

4. The method of claim 1, wherein the social media content includes text media, visual media, audio media, or any combination thereof.

5. The method of claim 1, wherein each strip of the multiple strips is individually manipulable to provide insights into the time-varying information used to create each strip.

6. The method of claim 1, further comprising:
providing a target data threshold that, when reached, causes an alert message to be generated; and
providing a summary data panel that shows current data values for the time-varying information compared with a selected moment from the past.

7. The method of claim 1, wherein said displaying comprises:
posting the arrangement on a network-accessible interface accessible to a user via a Uniform Resource Locator (URL).

8. The method of claim 7, further comprising:
receiving input indicative of a request to share the URL with a second user;
causing transmission of the URL to the second user across a network; and
enabling multi-user engagement with the network-accessible interface by displaying comments created by the user and the second user.

9. The method of claim 1, further comprising:
receiving second input indicative of a selection of the given strip;
receiving third input indicative of an identification of a filtering criterion;
in response to receiving the third input,
filtering the time-varying information used to create the given strip using the filtering criterion; and
modifying the given strip based on an outcome of said filtering.

10. A non-transitory computer-readable medium with instructions stored thereon that, when executed by a processor, cause the processor to perform operations comprising:
receiving, by a computing device, input indicative of a selection of multiple independent sources from which to obtain data related to a company;
in response to receiving the input,
automatically acquiring multiple datasets from the multiple independent sources,
wherein each of the multiple datasets includes time-varying information of a different type representing data comprising audio, video, event, activity, or graph that is contiguous across an interval of time;
subjecting the multiple datasets to a normalizing operation that causes the time-varying information included therein to be aligned in a temporal domain;
for each of the multiple datasets, creating a strip from the time-varying information included therein, so as to create multiple strips,
wherein each strip represents a coherent visualization of the time-varying information included in a corresponding one of the multiple datasets across a specified period of time in the form of a line chart or a bar chart, the specified period of time being at least a subset of the interval of time;
integrating social media content within a given strip in a time-synchronous manner such that the social media content is located vertically adjacent to a corresponding portion of the time-varying information represented in the given strip;
displaying the multiple strips in an arrangement to effect a multi-dimensional visualization of the time-varying information included in the multiple datasets, wherein the arrangement aligns the multiple strips along a common timeline and at least two strips of the multiple strips present two different types of time-varying information;
creating programmatic links between the multiple strips through pattern recognition; and
reconfiguring the multiple strips based on the programmatic links, such that related time-varying information is automatically shown in adjacent strips.

11. The non-transitory computer-readable medium of claim 10, wherein the operations further comprise:

placing the time-varying information from each of the multiple independent sources into a common format along a common scale.

12. The non-transitory computer-readable medium of claim 10, wherein the multiple independent sources include information related to social media, news, Web traffic, marketing activity, advertising campaign activity, internal systems status, or financial market activity.

13. A computing device comprising: a memory that includes instructions for creating multi-dimensional visualizations of time-varying information, wherein the instructions, when executed by a processor, cause the processor to perform operations comprising:
  receiving input indicative of a selection of multiple independent sources from which to obtain data related to a company;
  in response to receiving the input,
    automatically acquiring multiple datasets from the multiple independent sources,
    wherein each of the multiple datasets includes time-varying information of a different type representing data comprising audio, video, event, activity, or graph that is contiguous across an interval of time;
  subjecting the multiple datasets to a normalizing operation that causes the time-varying information included therein to be aligned in a temporal domain;
  for each of the multiple datasets, creating a strip from the time-varying information included therein, so as to create multiple strips,
  wherein each strip represents a coherent visualization of the time-varying information included in a corresponding one of the multiple datasets across a specified period of time in the form of a line chart or a bar chart, the specified period of time being at least a subset of the interval of time;
  integrating social media content within a given strip in a time-synchronous manner such that the social media content is located vertically adjacent to a corresponding portion of the time-varying information represented in the given strip;
  displaying the multiple strips in an arrangement to effect a multi-dimensional visualization of the time-varying information included in the multiple datasets, wherein the arrangement aligns the multiple strips along a common timeline and at least two strips of the multiple strips present two different types of time-varying information;
  creating programmatic links between the multiple strips through pattern recognition; and
  reconfiguring the multiple strips based on the programmatic links, such that related time-varying information is automatically shown in adjacent strips.

14. The computing device of claim 13, wherein the instructions further cause the processor to:
  apply a function to the time-varying information used to create one or more strips to produce a derived strip; and
  cause display of the derived strip along the common timeline.

15. The computing device of claim 13, wherein the instructions further cause the processor to:
  nest at least two strips inside of a summary strip that shows an aggregated view of corresponding sources.

16. The computing device of claim 13, wherein the instructions further cause the processor to:
  adjust a scale of the common timeline to support a comparison of events from different periods of time.

17. The computing device of claim 13, wherein the instructions further cause the processor to:
  receive input indication of a filtering criterion to be applied to a given source of the multiple independent sources; and
  apply the filtering criterion to the time-varying information obtained from the given source, thereby causing the corresponding strip to be modified while all other strips of the multiple strips remain unmodified.

* * * * *